US008011003B2

(12) United States Patent
Rowney et al.

(10) Patent No.: US 8,011,003 B2
(45) Date of Patent: *Aug. 30, 2011

(54) METHOD AND APPARATUS FOR HANDLING MESSAGES CONTAINING PRE-SELECTED DATA

(75) Inventors: Kevin T. Rowney, San Francisco, CA (US); Vitali Fridman, Belmont, CA (US); Eric Bothwell, Redwood City, CA (US)

(73) Assignee: Symantec Corporation, Mountain View, CA (US)

( * ) Notice: Subject to any disclaimer, the term of this patent is extended or adjusted under 35 U.S.C. 154(b) by 1174 days.

This patent is subject to a terminal disclaimer.

(21) Appl. No.: 11/057,988

(22) Filed: Feb. 14, 2005

(65) Prior Publication Data

US 2006/0224589 A1 Oct. 5, 2006

(51) Int. Cl.
*G06F 12/16* (2006.01)
(52) U.S. Cl. ............... 726/13; 709/225; 726/1; 726/11; 726/12; 726/26; 726/27; 726/28; 726/29; 726/30
(58) Field of Classification Search .................. None
See application file for complete search history.

(56) References Cited

U.S. PATENT DOCUMENTS

| | | | |
|---|---|---|---|
| 4,858,152 A | 8/1989 | Estes | |
| 5,212,821 A | 5/1993 | Gorin et al. | |
| 5,379,391 A | 1/1995 | Belsan et al. | |
| 5,384,892 A | 1/1995 | Strong | |
| 5,577,249 A | 11/1996 | Califano | |
| 5,796,948 A | 8/1998 | Cohen | |
| 5,832,212 A | 11/1998 | Cragun et al. | |
| 5,835,722 A | 11/1998 | Bradshaw et al. | |
| 5,883,588 A | 3/1999 | Okamura | |
| 5,884,033 A | 3/1999 | Duvall et al. | |
| 5,892,905 A | 4/1999 | Brandt et al. | |
| 5,958,015 A | 9/1999 | Dascalu | |
| 5,960,080 A | 9/1999 | Fahlman et al. | |
| 5,996,011 A | 11/1999 | Humes | |
| 6,047,283 A | 4/2000 | Braun | |
| 6,055,538 A | 4/2000 | Kessenich et al. | |
| 6,065,056 A | 5/2000 | Bradshaw et al. | |
| 6,073,142 A | 6/2000 | Geiger et al. | |
| 6,094,689 A | 7/2000 | Embry et al. | |
| 6,138,168 A | 10/2000 | Kelly et al. | |
| 6,233,618 B1 | 5/2001 | Shannon | |

(Continued)

FOREIGN PATENT DOCUMENTS

CA    2 499 508    4/2004

(Continued)

OTHER PUBLICATIONS

Alonso, Omar, et al, Oracle Secure Enterprise Search 10g, An Oracle Technical White Paper, Mar. 2006, 21 pages.

(Continued)

*Primary Examiner* — Kaveh Abrishamkar
(74) *Attorney, Agent, or Firm* — Lowenstein Sandler PC

(57) ABSTRACT

A method and apparatus for blocking messages containing pre-selected data is described. In one embodiment, the method includes determining that a message transmitted to a recipient via a network includes pre-selected data. The pre-selected data contains information from at least one random row within the tabular structure of source data. The method further includes preventing an unauthorized transmission of the pre-selected data to the recipient.

21 Claims, 23 Drawing Sheets

U.S. PATENT DOCUMENTS

| | | | |
|---|---|---|---|
| 6,314,190 B1 | 11/2001 | Zimmermann | |
| 6,321,224 B1 | 11/2001 | Beall et al. | |
| 6,347,374 B1 | 2/2002 | Drake et al. | |
| 6,360,215 B1 | 3/2002 | Judd et al. | |
| 6,374,241 B1 | 4/2002 | Lamburt et al. | |
| 6,396,513 B1 | 5/2002 | Helfman et al. | |
| 6,442,607 B1 | 8/2002 | Korn et al. | |
| 6,442,686 B1 | 8/2002 | McArdle et al. | |
| 6,453,338 B1 | 9/2002 | Shiono | |
| 6,507,846 B1 | 1/2003 | Consens | |
| 6,604,141 B1 | 8/2003 | Ventura | |
| 6,618,725 B1 | 9/2003 | Fukuda et al. | |
| 6,636,838 B1 | 10/2003 | Perlman et al. | |
| 6,639,615 B1 | 10/2003 | Majumdar et al. | |
| 6,701,314 B1 | 3/2004 | Conover et al. | |
| 6,711,579 B2 | 3/2004 | Balakrishnan | |
| 6,714,936 B1 | 3/2004 | Nevin, II | |
| 6,732,087 B1 | 5/2004 | Hughes et al. | |
| 6,768,986 B2 | 7/2004 | Cras et al. | |
| 6,769,032 B1 | 7/2004 | Katiyar et al. | |
| 6,778,979 B2 | 8/2004 | Grefenstette et al. | |
| 6,779,120 B1 | 8/2004 | Valente et al. | |
| 6,829,613 B1 | 12/2004 | Liddy | |
| 6,829,635 B1 | 12/2004 | Townsend | |
| 6,871,284 B2 | 3/2005 | Cooper et al. | |
| 6,941,466 B2 | 9/2005 | Mastrianni | |
| 6,965,886 B2 | 11/2005 | Govrin et al. | |
| 6,983,186 B2 | 1/2006 | Navani et al. | |
| 6,996,788 B2 | 2/2006 | Akiba et al. | |
| 7,003,562 B2 | 2/2006 | Mayer | |
| 7,114,185 B2 | 9/2006 | Moore et al. | |
| 7,130,885 B2 | 10/2006 | Chandra et al. | |
| 7,146,402 B2 | 12/2006 | Kucherawy | |
| 7,162,738 B2 * | 1/2007 | Dickinson et al. | 726/14 |
| 7,191,252 B2 | 3/2007 | Redlich et al. | |
| 7,222,158 B2 * | 5/2007 | Wexelblat | 709/206 |
| 7,237,008 B1 | 6/2007 | Tarbotton et al. | |
| 7,249,175 B1 * | 7/2007 | Donaldson | 709/225 |
| 7,320,004 B1 | 1/2008 | DeLuca et al. | |
| 7,472,114 B1 * | 12/2008 | Rowney et al. | 707/3 |
| 7,516,492 B1 * | 4/2009 | Nisbet et al. | 726/27 |
| 7,523,498 B2 * | 4/2009 | Fellenstein et al. | 726/22 |
| 2001/0037324 A1 | 11/2001 | Agrawal et al. | |
| 2002/0010679 A1 | 1/2002 | Felsher | |
| 2002/0069098 A1 | 6/2002 | Schmidt | |
| 2002/0073313 A1 | 6/2002 | Brown et al. | |
| 2002/0093676 A1 | 7/2002 | Parry | |
| 2002/0129140 A1 | 9/2002 | Peled et al. | |
| 2002/0138579 A1 | 9/2002 | Goldberg | |
| 2002/0178228 A1 | 11/2002 | Goldberg | |
| 2002/0198766 A1 | 12/2002 | Magrino et al. | |
| 2002/0199095 A1 * | 12/2002 | Bandini et al. | 713/151 |
| 2003/0051026 A1 | 3/2003 | Carter et al. | |
| 2003/0093518 A1 | 5/2003 | Hiraga | |
| 2004/0039991 A1 | 2/2004 | Hopkins et al. | |
| 2004/0225645 A1 * | 11/2004 | Rowney et al. | 707/3 |
| 2005/0027723 A1 * | 2/2005 | Jones et al. | 707/100 |
| 2005/0060537 A1 | 3/2005 | Stamos et al. | |
| 2005/0086252 A1 * | 4/2005 | Jones et al. | 707/102 |
| 2005/0138110 A1 | 6/2005 | Redlich et al. | |
| 2005/0182765 A1 | 8/2005 | Liddy | |
| 2005/0216771 A1 | 9/2005 | Malcolm | |
| 2006/0005247 A1 | 1/2006 | Zhang et al. | |
| 2006/0184549 A1 | 8/2006 | Rowney et al. | |
| 2006/0224589 A1 | 10/2006 | Rowney et al. | |
| 2007/0130255 A1 | 6/2007 | Wolovitz et al. | |
| 2008/0066150 A1 | 3/2008 | Lim | |

FOREIGN PATENT DOCUMENTS

| | | |
|---|---|---|
| CA | 2 597 083 | 8/2006 |
| GB | 2343030 A | 4/2000 |
| GB | 2466367 A | 6/2010 |
| JP | 2005-539334 | 12/2005 |
| JP | 2008-8171101 | 7/2008 |
| JP | 2008-537195 | 9/2008 |
| WO | WO2004/027653 | 4/2004 |
| WO | WO2006/088952 | 8/2006 |

OTHER PUBLICATIONS

Attenex, Attenex Patterns Suite, http://www.attenex.com/products_services/attenex_patterns_suite.aspx, Downloaded Feb. 20, 2008, 2 pages.

Autonomy, Autonomy Group product overview, http://www.autonomy.com/content/products/index.en.html, Downloaded Feb. 20, 2008, 2 pages.

Autonomy, Security, http://www.autonomy.com/content/Technology/Technology_Benefits/security, Feb. 20, 2008, 2 pages.

Autonomy, Technology overview, http://www.autonomy.com/content/Technmology/index.en.html, Downloaded Feb. 20, 2008, 2 pages.

Autonomy, Limitations of Other Approaches, http://www.autonomy.com/content/Technology/Limitations_Other_Approaches, Downloaded Feb. 20, 2008, 2 pages.

Buchta, Stefan, Oracle Secure Enterprise Search Version 10.1.8.2, An Oracle Technical White Paper, Oct. 2007, 30 pages.

Clearwell Systems, The Clearwell E-Discovery Platform®, http://www.clearwellsystems.com/products/e-discovery-platform, Downloaded Feb. 20, 2008 2 pages.

Clearwell Systems, The Clearwell E-Discovery Platform: Analysis, http://www.clearwellsystems.com/products/e-discovery-analysis.php, Downloaded Feb. 20, 2008, 1 page.

Clearwell Systems, The Clearwell E-Discovery Platform: Case Management, http://www.clearwellsystems.com/products/e-discovery-case-management, Downloaded Feb. 20, 2008 2 pages.

Clearwell Systems The Clearwell E-Discovery Platform: Processing, http://www.clearwellsystems.com/products/e-discovery-processing.php, Downloaded Feb. 20, 2008, 2 pages.

Clearwell Systems The Clearwell E-Discovery Platform:Review, http://www.clearwellsystems.com/products/e-discovery-review.php, Downloaded Feb. 20, 2008 2 pages.

Clearwell Systems The Clearwell E-Discovery Platform: Search &Cull-Down, http://www.clearwellsystems.com/products/e-discovery-search-cull.php, Downloaded Feb. 20, 2008 1 page.

Dale, et at, "Programming and Problem Solving with C++," 2002, Jones and Bartlett Publishers, 3rd Edition, pp. 653-662.

Deitai, et al., "C++—How to Program," 2001, Prentice Hall, 3rd Edition, pp. 273-279.

fast, Fast ESP Revitalizing your search experience with intelligent, user-centric search, 2007, Fast Search & Transfer ASA. , 6 pages.

Google, Google Search Appliance, http://www.google.com/enterprise/gsa/, Downloaded, Feb. 20, 2008, 2 pages.

Guidance Software, EnCase® eDiscovery Suite, http://www.guidancesoftware.com/products/ediscovery_index.aspx, Downloaded Feb. 20, 2008, 2 pages.

Kaufman, et al., "Network Security—Private Communication in a Public World," 1995, Prentice, Hall PTR, p. 80.

Koch, et al., "Oracle8—The Complete Reference," 1997, Osborn McGraw-Hill, pp. 9-7 and 51-62.

Krishnaprasad, Muralidhar, et al, Oracle Searching Enterprise Applications (Siebel 7.8 and E-Business Suite 11i) with Oracle Secure Enterprise Search 10.1.8, An Oracle White Paper, Jan. 2007, 25 pages.

Oracle Secure Enterprise Search 10G, Mar. 2006, 8 pages.

Oracle8™ Tuning, Release 8.0, Dec. 1997, Oracle®.

PCT Search Report PCT /US03/30178 dated Mar. 11, 2004, 5 pages.

PCT Search Report PCT /US06/15317 dated Jul. 24, 2006, 5 pages.

Zantaz, Enterprise Archive Solution (EAS) Product family, Datasheet, 4 pages.

Office Action for U.S. Appl. No. 10/247,002 mailed Mar. 3, 2006.

Office Action for U.S. Appl. No. 10/247,002 mailed Aug. 21, 2006.

Office Action for U.S. Appl. No. 10/247,002 mailed Jan. 23, 2007.

Office Action for U.S. Appl. No. 10/247,002 mailed Sep. 17, 2007.

Office Action for U.S. Appl. No. 10/247,002 mailed Dec. 12, 2007.

Office Action for U.S. Appl. No. 10/247,002 mailed Jun. 18, 2008.

Office Action for U.S. Appl. No. 10/431,145 mailed Oct. 23, 2006.

Office Action for U.S. Appl. No. 10/431,145 mailed Jul. 26, 2007.

Office Action for U.S. Appl. No. 10/431,145 mailed Feb. 25, 2008.

Notice of Allowance for U.S. Appl. No. 10/431,145 mailed Aug. 20, 2008.

Office Action for U.S. Appl. No. 10/607,718 mailed Feb. 10, 2006.

Office Action for U.S. Appl. No. 10/607,718 mailed Jun. 28, 2006.
Office Action for U.S. Appl. No. 10/607,718 mailed Nov. 15, 2006.
Office Action for U.S. Appl. No. 10/607,718 mailed Jul. 10, 2007.
Office Action for U.S. Appl. No. 10/607,718 mailed Jan. 8, 2008.
Office Action for U.S. Appl. No. 10/607,718 mailed Jul. 3, 2008.
Office Action for U.S. Appl. No. 10/833,538 mailed Oct. 31, 2006.
Office Action for U.S. Appl. No. 10/833,538 mailed Jul. 23, 2007.
Office Action for U.S. Appl. No. 10/833,538 mailed Feb. 14, 2008.
Notice of for U.S. Appl. No. 10/833,538 mailed Aug. 6, 2008.
Office Action for U.S. Appl. No. 10/892,982 mailed Jan. 23, 2007.
Office Action for U.S. Appl. No. 10/892,982 mailed Sep. 17, 2007.
Office Action for U.S. Appl. No. 10/892,982 mailed Apr. 8, 2008.
Office Action for U.S. Appl. No. 10/892,982 mailed Oct. 27, 2008.
Office Action for U.S. Appl. No. 10/892,615 mailed Apr. 27, 2007.
Office Action for U.S. Appl. No. 10/892,615 mailed Dec. 12, 2007.
Office Action for U.S. Appl. No. 11/058,551 mailed Sep. 9, 2008.
(CISCO) A Report From Ironport Systems , "Data Loss Prevention Best Practices—Managing Sensitive Data in the Enterprise", 2007, 21 pages.
Office Action for U.S. Appl. No. 10/247,002 mailed Nov. 25, 2008.
Office Action for U.S. Appl. No. 10/892,982 mailed Feb. 12, 2009.
Office Action for U.S. Appl. No. 10/892,615 mailed Dec. 5, 2008.
Office Action for U.S. Appl. No. 11/058,551 mailed Mar. 20, 2009.
Office Action for U.S. Appl. No. 10/247,002 mailed May 21, 2009.
Notice of Allowance for U.S. Appl. No. 10/431,145 mailed Jun. 5, 2009.
Office Action for U.S. Appl. No. 10/607,718 mailed May 1, 2009.
Office Action for U.S. Appl. No. 10/892,982 mailed Jul. 20, 2009.
Office Action for U.S. Appl. No. 10/892,615 mailed May 12, 2009.
Office Action for U.S. Appl. No. 11/058,551 mailed Sep. 11, 2009.
GB0921722.5 Search Report dated Mar. 26, 2010, 1 page.
Office Action for U.S. Appl. No. 10/247,002 mailed Dec. 31, 2009.
Office Action for U.S. Appl. No. 10/607,718 mailed Nov. 14, 2008.
Office Action for U.S. Appl. No. 10/607,718 mailed Nov. 9, 2009.
Office Action for U.S. Appl. No. 10/607,718 mailed Apr. 12, 2010.
Office Action for U.S. Appl. No. 10/892,982 mailed Jan. 6, 2010.
Office Action for U.S. Appl. No. 10/892,615 mailed Mar. 24, 2010.
Office Action for U.S. Appl. No. 11/058,551 mailed Mar. 8, 2010.
Office Action for U.S. Appl. No. 10/247,002 mailed Dec. 31, 2009.
Office Action for U.S. Appl. No. 10/607,718 mailed Aug. 17, 2010.
Advisory Action for U.S. Appl. No. 10/892,615 mailed Jul. 2, 2010.
Office Action for U.S. Appl. No. 11/058,551 mailed Aug. 2, 2010.
Office Action for U.S. Appl. No. 12/179,630 mailed Aug. 31, 2010.

* cited by examiner

METHOD AND APPARATUS FOR HANDLING MESSAGES CONTAINING PRE-SELECTED DATA

FIELD OF INVENTION

The present invention relates to the field of processing data; more particularly, the present invention relates to handling messages containing pre-selected (e.g., proprietary) data.

BACKGROUND OF THE INVENTION

Many organizations store large amounts of security-sensitive information in relational databases. This type of data is usually subjected to very thorough security measures including physical security, access control, perimeter security restrictions, and—in some cases—encryption. Since access to database data is essential to the job function of many employees in the enterprise, there are many possible points of possible theft or accidental distribution of this information. Theft or benign inadvertent disclosure of information represents a significant business risk both in terms of the value of the intellectual property as well as the legal liabilities related to regulatory compliance.

Relational Database Systems

Relational database systems are useful for a huge range of applications. Relational structures hold data in a fashion that presents naturally intuitive ways to query the data, and has the added advantage of hiding the details of the underlying disk storage system from the user. The typical applications for database systems involve the storage and retrieval of a large number of smaller pieces of data that can be naturally formatted into a table structure. Relational databases have high utility because the types of queries that most people care about can be optimized using the well-known index structures outlined below.

The queries requested of relational database systems use a naturally intuitive predicate logic called Structured Query Language (SQL) that allows the user to succinctly request the tabular data that she/he may be looking for. Database tables almost always come equipped with an index that makes queries based on SQL more efficient. These indices are stored in memory using a data structure called a B-tree. The salient characteristics of B-trees most relevant to the current discussion are as follows:

B-trees are an abstract data structure based on the binary tree;

B-trees must contain some copies of the data that they index; and

B-trees are most efficient using the query examples outlined below.

Here are a number of query examples:

Exact match queries of the form A=v, where:
A refers to the column or "attribute" of a given database table
v refers to a specific attribute value
e.g., SELECT*FROM CUSTOMERS WHERE Income=30,000

Range queries of the form v1<A<v2, where:
A refers to the column or "attribute" of a given database table
e.g., SELECT*FROM CUSTOMERS WHERE 30<Income<40

Prefix queries of the form A MATCHES s*, where:
"s" refers to a specific string value
"s*" is a regular expression
e.g., Last_Name MATCHES "Smith*"

There are a number of references to original works in the field of database systems. The first is the seminal work on relational databases by E. F. Codd., "A Relational Model of Data for Large Shared Data Banks", Communications of the ACM, 13(6): 377-387, 1970.

The second reference is one of the first published works on the "B-Tree" data structure that is the fundamental data structure that enables efficient queries of the type outlined above. See Rudolf Bayer and Edward M. McCreight, "Organization and Maintenance of Large Ordered Indices", Record of the 1970 ACM SIGFIDET Workshop on Data Description and Access, Nov. 15-16, 1970, Rice University, Houston, Tex., USA (Second Edition with an Appendix), pages 107-141, ACM, 1970.

Information Retrieval Systems

Information retrieval is a broad field that deals with the storage and retrieval of textual data found in documents. These systems are different from those of database systems chiefly in their focus on standard documents instead of tabular data. Early examples of this system were developed as part of the SMART system at Cornell. Today, the best-known information retrieval applications are web-based search engines like Google, Inktomi, and AltaVista. The typical way to use these systems is to find a reference to a document that is part of a larger set of digital documents. The user experience for these applications usually consists of a series of queries interleaved with browsing of the results. Results of the queries are presented in order of descending relevance, and the user is able to refine the queries after further browsing. As with relational databases, the huge popularity of these systems is due to the ability of the underlying indices to deliver quick responses to the types of queries that people find most useful.

Most of these systems are based on indices that are derived from so-called "concordances" that are built up from the collection of documents indexed. These concordances contain a data structure that lists, for each word, the location of each occurrence of that word in each of the documents. Such data structures allow quick lookups of all documents that contain a particular term. For user queries that ask for all documents that contain a collection of terms, the index is structured so that it represents a large number of vectors in Euclidean vector space of high dimension. The user's list of query terms is then also re-interpreted as a vector in this space. The query is run by finding which vectors in the document space are nearest to the query vector. This last approach has a variety of different optimizations applied to it for accuracy and speed, and is called the "cosine metric".

As mentioned above, the typical user interaction with these sorts of systems is an iterative cycle of querying, browsing, refining, and back to querying again. Query results are usually large numbers of documents that are ranked in order of relevance, and the false positive rate can be very high. Here are some classic examples of queries.

Boolean queries like:
a) all documents that contain the terms "database" and "indices"
b) all documents that contain "database" or "indices" but not "Sybase"Link-based queries like:
a) all documents that are linked to by documents that contain the term "dog"
b) the most "popular" (i.e. linked to) document that contains the word "dog"

One of the first significant implementation projects of information retrieval systems is the SMART system at Cornell. This system contains many of the essential components of information retrieval systems still in use today: C. Buckley, "Implementation of the SMART Information Retrieval System", Technical Report TR85-686, Cornell University, 1985

The WAIS project was an early application of the massively parallel super-computer produced by Thinking Machines Inc. This is one of the first fielded information retrieval systems made available over the Internet. This primary reference source for this work is by Brewster Kahle and Art Medlar: "An Information System for Corporate Users: Wide Area Information Servers." Technical Report TMC-199, Thinking Machines, Inc., April 1991, version 3.19.

Among the many contemporary commercial vendors of Internet search services is Google. Google's real breakthrough in search accuracy is its ability to harvest data from both the text of the documents that are indexed as well as the hyper-link structure. See Sergey Brin, Lawrence Page, "The Anatomy of a Large-Scale Hypertextual Web Search Engine", http://dbpubs.stanford.edu:8090/pub/1998-8

File Shingling Systems

The growth of the Internet and affordable means of copying and distributing digital documents spurred research interest in technologies that can help detect illegal or inappropriate copies of documents. The primary application for this work was to detect the violation of copyright law, and to detect plagiarism. There is also significant interest in this problem as it relates to spam-email (AKA unsolicited commercial email) detection and automatic elimination. The technical term applied to describe most of these techniques is "file shingling" in which adjacent sequences of document fragments are reduced to "shingles" by hash codes, and then stored in a lookup table in the same sequence as they are found in the document.

File shingling provides a very quick way to look for similarity between two documents. In order to provide protection to a specific document (e.g., a text file) the document is shingled by hashing the document sentence-by-sentence and storing these hashed sentences in a table for quick lookup. In order to test a new document to see if it contains fragments of copyrighted content, the same hash function is applied to each fragment of the test message to see if the fragments appear in a similar order as they do in the copyrighted content. The technique is quick because the time required to lookup an individual fragment can be very fast.

The typical user interaction with a file shingling system is passive instead of active. File shingling systems are usually set up to process documents automatically and deliver the query results to a user asynchronously. A typical file shingling application might be spam prevention where a set of messages is used to create an index of restricted content that an organization does not want delivered to its email systems. In this scenario, the "query" is just the automatic processing of email messages and appropriate automatic routing.

With respect to document equivalency queries, for each test document t, find all documents d in our collection of indexed documents that have the same contents as t. For the case of spam detection, the set d could be all of the known active spam messages, and the document t could be an incoming email message.

With respect to cut-and-paste detection queries, for each test document t, find all documents d in our collection of indexed documents in which some fragment of d occurs in t. For the case of plagiarism detection, the set d could be all of the previously submitted essays for a particular class, and the document t could be a new paper written by a student who is suspected of plagiarism.

The main published research projects in file shingling are called KOALA, COPS, and SCAM. They all use variants on the basic file shingling approach described above with variants that optimize performance and accuracy. For information on KOALA, see N. Heintze, "Scalable Document Fingerprinting", Proceedings of Second USENIX Workshop on Electronic Commerce, November 1996. http://www-2.cs.cmu.edu/afs/cs/user/nch/wwwlkoala/main.html. For information on COPS, see S. Brin, J. Davis, and H. Garcia-Molina, "Copy Detection Mechanisms for Digital Documents", Proceedings of the ACM SIGMOD Annual Conference, May 1995. For information on SCAM, see N. Shivakumar and H. Garcia-Molina, "SCAM: A Copy Detection Mechanism for Digital Documents", Proceedings of 2nd International Conference in Theory and Practice of Digital Libraries (DL'95), June 1995, http://www-db.stanford.edu/~shiva/SCAM/scamInfo.html, and also see (by N. Shivakumar and H. Garcia-Molina), "Building a Scalable and Accurate Copy Detection Mechanism", Proceedings of 1st ACM Conference on Digital Libraries (DL'96) March 1996, http://www-db.stanford.edu/pub/papers/performance.ps.

Internet Content Filtering Systems

A variety of commercial applications, referred to as content filtering systems, implement protection measures. There are two major types of applications in this category: web site restriction/monitoring software, and email content control. In both cases, the main algorithm currently in use is pattern matching against a set of regular expressions for a set collection of text fragments that would indicate data misuse. An example might be to restrict all browsing at URLs that contain the text fragment "XXX". An example for the email content control category is stopping and blocking all email that contains the words "proprietary" and "confidential" but not the words "joke" or "kidding".

Firewalls, Intrusion Detection, and Intrusion Prevention Systems

A common type of message processing system is called a firewall. Firewalls and Intrusion Detection Systems monitor communications between networks and implement content filtering based on rules like source and destination address, port number, and packet contents. These rules are typically based on exact matching and pattern matching as described above. When these systems detect that an unauthorized communication is made, they can either block the communication, re-route it, or just report it.

Anti-virus Systems

Anti-virus systems search messages (typically email and HTTP messages) for malicious executable code. If a message is found to contain a fragment of executable code that matches a virus signature; then the message is either blocked, deleted, or re-routed to a quarantine server. The typical search algorithm applied to detect malicious code is searching for known fragments of the malicious code inside the suspect message via direct comparison.

Anti-spam Systems

There are a variety of systems that help block unsolicited commercial messages (commonly known as "spam"). These systems monitor incoming messages (typically email messages) and filter them using content detection algorithms that specialize in the recognition of commercial messages. Three well-known approaches exist: 1) source black-listing, 2) exact matching, and 3) statistical profiling. In source black-listing, known sources of spam are identified and then communications from those sources are ignored. In exact matching, incoming messages are compared in their entirety or in fragmentary form on a direct basis with known samples of spam and if found to have sufficient overlap; then the incoming message is rejected or quarantined. In statistical profiling, known samples of spam are profiled using statistical techniques (e.g., Bayesian analysis or word use frequency). Statistical profiles are then also taken of incoming messages as they arrive and if the profile of an incoming message matches that of a spam message; then the message is discarded, or re-directed to a quarantine server.

SUMMARY OF THE INVENTION

A method and apparatus for handling messages containing pre-selected data from a tabular data source is described. In one embodiment, the method includes determining that a message transmitted to a recipient via a network includes pre-selected data from a designated tabular data source. The pre-selected data contains information from at least one random row within the tabular structure of source data. The method further includes preventing an unauthorized transmission of the pre-selected data to the recipient.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 9-12A are flow diagrams of alternative embodiments of a process for preventing unauthorized transmission of pre-selected sensitive data.

FIGS. 13-16A are flow diagrams of alternative embodiments of a process for modifying messages based on presence of pre-selected data.

DETAILED DESCRIPTION OF THE PRESENT INVENTION

Figure 1:
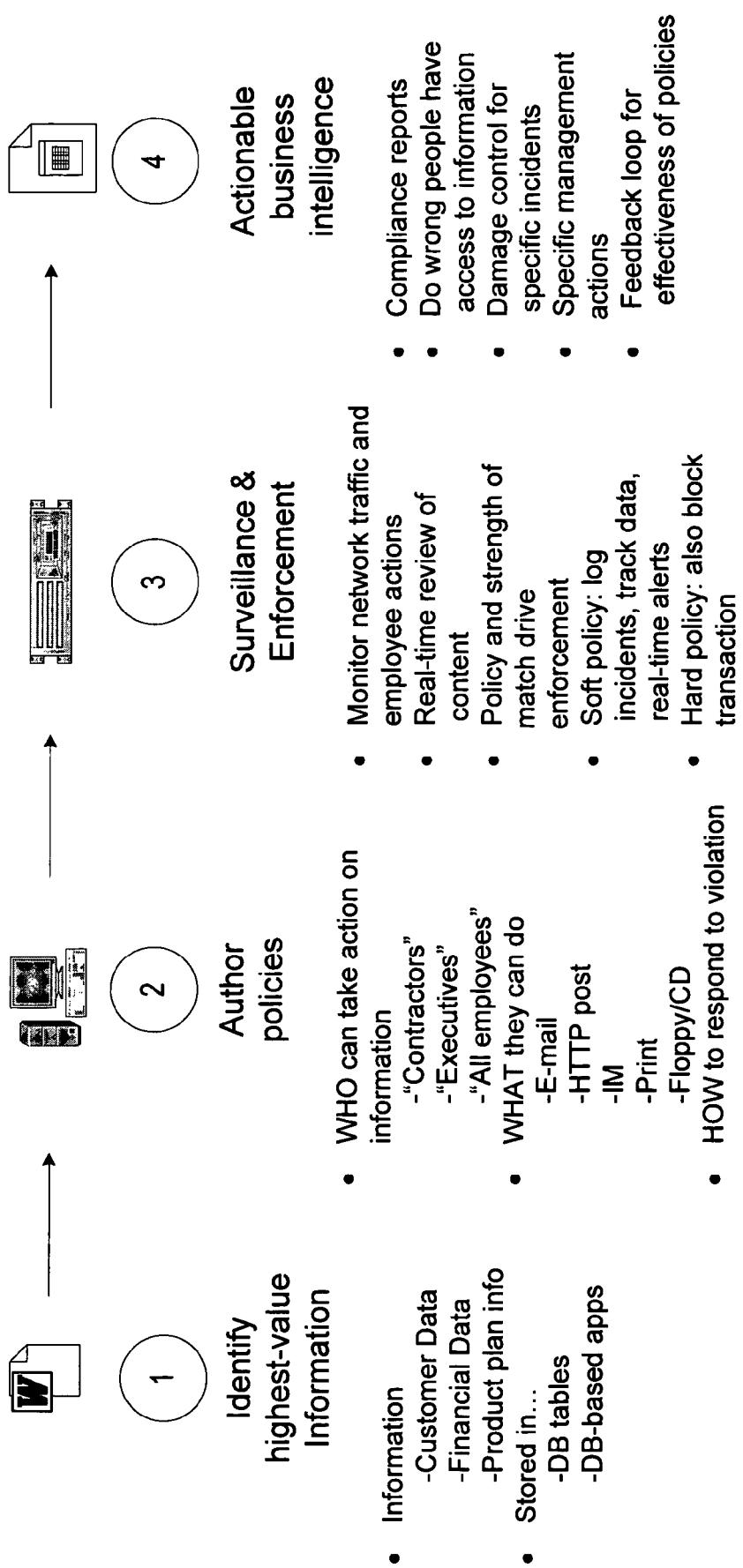
FIG. 1 illustrates one embodiment of a workflow.

A system and method for handling messages containing pre-selected sensitive data is described. In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing or transmitting information in a form readable by a machine (e.g., a computer). For example, a computer-readable storage medium includes read only memory ("ROM"); random access memory ("RAM); magnetic disk storage media; optical storage media; flash memory devices; etc.

Components of an Exemplary Embodiment

In one embodiment, the system to perform the detection scheme described herein consists of two main components: a Policy Management System (PMS) and a Message Monitoring System (MMS). The PMS is responsible for accepting user input that determines information security policies for the use and transmission of source data (e.g., database data) that is contained inside messages sent over the network or is stored in data storage media of the personal computing devices such as portable computers, desktop computers, Personal Digital Assistants, cell-phones, etc. This data is, thus, preselected. The term "data storage media of a personal computing device" as used herein refers to any storage within the personal computing device or accessible to the personal computing device that may store, temporarily or permanently, data for the personal computing device.

The MMS is responsible for performing content searches on messages sent over the network, data processed by personal computing devices, or data stored on data storage media of personal computing devices, and is responsible for implementing the policy identified to the PMS by the user. In one embodiment, both of these systems are coupled to a computer network that communicates any of the standard protocols for the exchange of information.

In the normal course of operation in this embodiment, a user may decide to implement a given policy that restricts the use or transmission of source data by certain individuals and then enters this policy into the PMS using a graphical-user-interface and one or more user input devices (e.g., a mouse, a keyboard, etc.). The user interface receives the input and may be running on a computer system with the PMS or on a separate machine. In one embodiment, the policy includes the nature of protection desired (e.g., restrict only a subset of employees), the type of data that requires protection (e.g., database data), and the network location (e.g., database table name, IP address of server, server or file name) of the database data that requires protection.

At regular intervals, which in one embodiment are adjustable by the user but defaulting to once per specified interval (e.g., day), the PMS extracts copies of source data that is to be protected and derives from that data an abstract data structure (hereafter called the "index") that is described in more detail below.

The PMS then sends this index, along with the particulars on the policy that is to be implemented, to the MMS so that it can begin to enforce that policy. The MMS receives the index from the PMS together with the details on the policy to be enforced. The MMS uses the index and the policy information to enforce the policy specified by the user. In one embodiment, the MMS uses this index to search each of the outgoing messages (e.g., email messages, web mail messages, etc.) for the source data that is to be protected, as will be discussed in greater detail below. In another embodiment, the MMS uses this index to search contents of data storage media of a personal computing device and/or the content of interactions between the user and the personal computing device for the database data that is to be protected.

A summary of an exemplary workflow can be found in FIG. 1, where the highest-value information is identified, policies are authored, and surveillance and enforcement are performed, leading to actionable business intelligence.

Network-Based Modes of Operation

Figure 2:
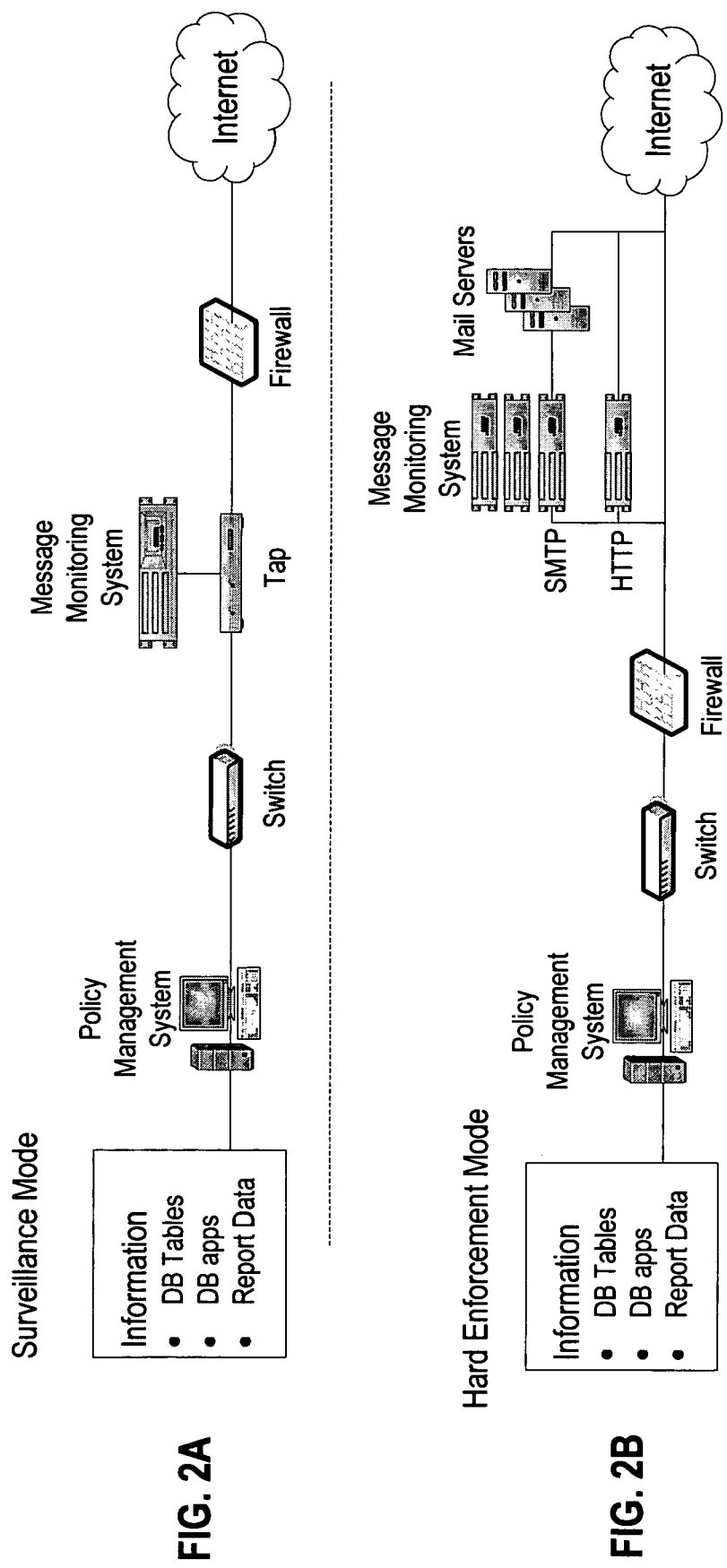
FIGS. 2A and 2B illustrate exemplary modes of operation.

In one embodiment, the Message Monitoring System can be configured in one of two ways: "surveillance mode", and "enforcement mode". FIGS. 2A and 2B illustrate two network configurations. In "surveillance mode" illustrated in FIG. 2A, the MMS is placed somewhere on the network where it can watch traffic and report on violations of policy, but it is specifically not configured to block messages as they leave. The PMS has access to information and is coupled to the Internet via a switch, a tap and a firewall. The MMS monitors the network messages using the tap.

In "enforcement mode" illustrated in FIG. 2B, the MMS is able to watch traffic and report on violations, but it can also intercept and re-route messages so that their ultimate destination is changed. The PMS has access to information and is coupled to the Internet via a switch and a firewall. In this embodiment, the MMS monitors traffic using a series of servers and re-routes traffic to, for example, certain servers, if the MMS determines messages are likely to contain preselected information. The MMS may use different servers for each of the various layer protocols.

Message re-routing is not required. Alternatively, the MMS can be configured to just intercept and stop an outgoing message. An example policy in "enforcement mode" is to route all messages that violate a policy to the manager of the person that violates the policy so that appropriate disciplinary action can take place. The operation of the MMS in "enforcement mode" will be discussed in greater detail below in conjunction with FIGS. 8-10.

In both modes of operation, it is possible to install multiple MMSs, each with its own copy of the indices required to detect content. This parallel processing configuration helps with problems of scale and with protecting multiple possible points of egress of information.

In both configurations, the MMS is actively parsing messages that are transported using various protocols (e.g., simple mail transfer protocol (SMTP), hypertext transfer protocol (HTTP), file transfer protocol (FTP), AOL Instant Messaging (AIM), ICQ, single object access protocol (SOAP), SQLNet, transmission control protocol/Internet protocol (TCP/IP), user datagram protocol (UDP), Ethernet, 802.11, etc.).

In one embodiment, the two subsystems (PMS and MMS) run on one Local Area Network (LAN). However, the PMS and MMS may be incorporated into the same physical or logical system. This consolidated configuration is more appropriate for reasons of control cost of goods required to produce the system.

In yet another alternative embodiment, the PMS and MMS may not necessarily reside on the same LAN. The PMS may reside on the same LAN as the database information, but the MMS may reside on a different LAN that is separated from the LAN on which PMS resides. In this configuration, the two distinct LANs may ultimately be coupled together via the Internet but separated by firewalls, routers, and/or other network devices. This is an advantageous configuration for the case where a company wants to restrict another company that needs their database data (such as a law firm or marketing agency) from violating the first company's database data policy.

Figure 3:
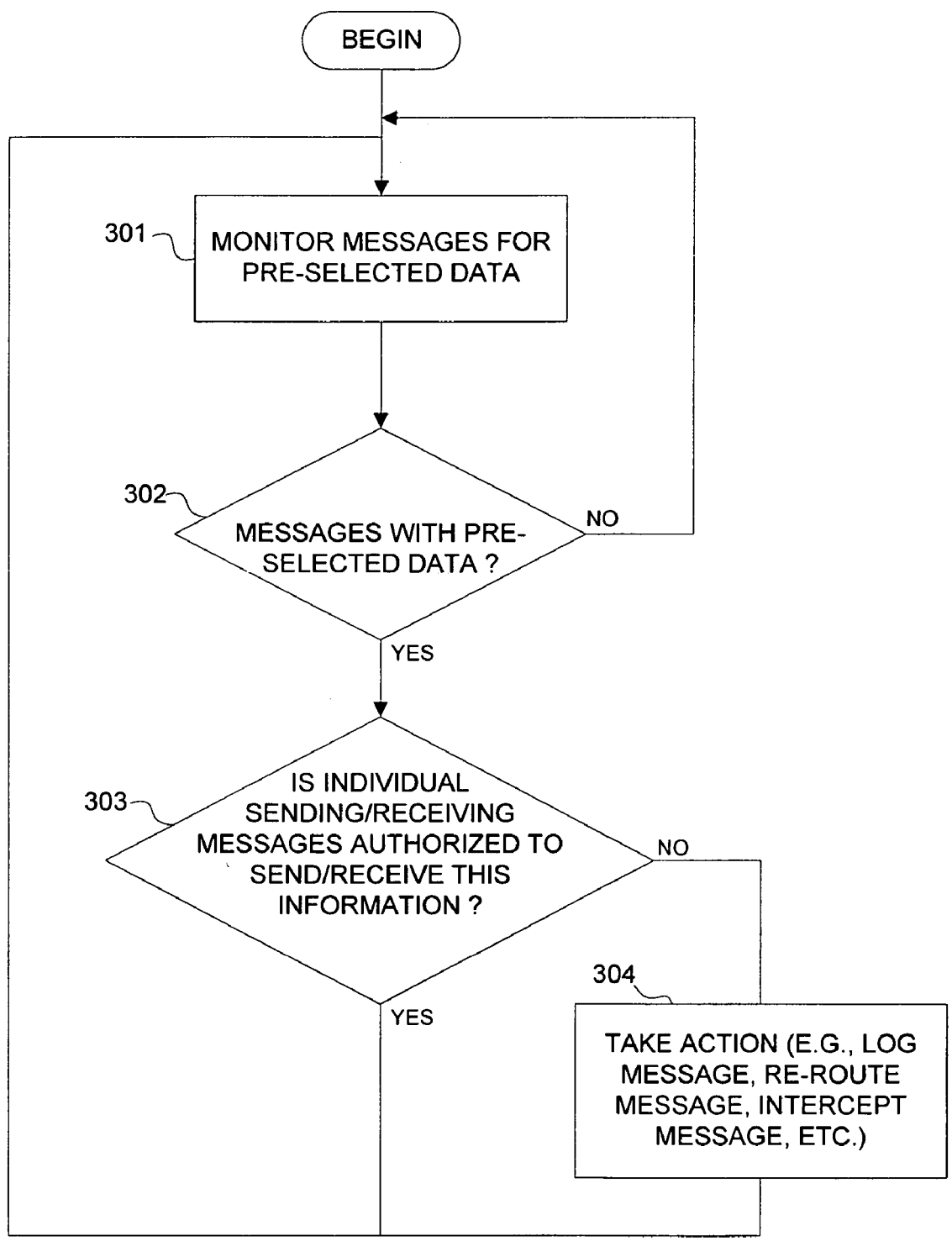
FIG. 3 is a flow diagram of one embodiment of a process for protecting database data.

FIG. 3 is a flow diagram of one embodiment of a process for protecting source data. The process is performed by processing logic that may comprise hardware (circuitry, dedicated logic, etc.), software (such as is run on a general purpose computer system or a dedicated machine), or a combination of both.

Referring to FIG. 3, processing logic monitors messages for pre-selected data (processing block 301). Next, processing logic determines whether a message has pre-selected data (processing block 302). If not, processing transitions to processing block 301. If so, processing logic determines if the individual sending/receiving message is authorized to send/receive the information in the message (processing block 303). If so, the process ends and processing transitions to processing block 301. If not, processing logic takes one or more actions such as intercepting the message, re-routing the message, logging the message, etc. (processing block 304) and processing transitions to processing block 301. These actions will be discussed in greater detail below in conjunction with FIGS. 8-10.

Exemplary Search Techniques

As discussed above, violations are detected by searching information content using predefined policies. In one embodiment, a search is performed using an abstract data structure (index) derived from source data. In one embodiment, this index contains no copies of the source data, or contains only encrypted or hashed copies of the source data. This embodiment specifically avoids storing any representation of the data itself so that, in the case of a hacker breaking into the host that runs the DMS (which utilizes the index when performing content searches as discussed above), the data that is exposed to theft is inconsequential. The index may be created using a tuple-storage mechanism that provides a data structure for storing multiple tuples associated with fragments of the database data. Examples of the tuple-storage mechanism include a hash table, a vector, an array, a tree, a list, or a table in a relational database management system. In the process described below, the data stored in the indices only retains the relative placement of the elements in the database in relation to other elements. For example, in the case of a hash table, the index may store, for each fragment of the database data (e.g., a data fragment inside a database cell), the fragment's hash code together with its row number, column number and type of the column.

In another embodiment, indices contain fragments of the intellectual property that is under protection, thus reducing the value of the solution by exposing that information to security threats.

In yet another embodiment, copies of a small amount of frequently used strings and numbers from the database that represent a large proportion of the data in the system is still stored directly in the index along with the rest of the information on relative placement of data in the database table(s). This is done by storing copies of these common strings themselves, instead of hash codes. As a result, indices may include the row numbers, column numbers, and type of the source data, but instead of storing a hash code it stores the string itself. For the rest of the cells of the database that are not quite so common, only the row numbers, column numbers, and type of the source data are stored while specifically not storing copies of these strings. This approach uses the fact that the statistical distribution of string and numeric data in databases is often skewed so that the most common terms account for a very large percentage of the overall volume of data stored. Storing these common terms in a separate index helps index query efficiency since the small number of common terms accounts for a large proportion of the queries, and these queries can be run using standard quick techniques from the literature (e.g., hash table lookups, bitmaps, etc.). The reason that this is not a security vulnerability is that this small number of terms that account for a disproportionate share of volume of source data are the least valuable pieces of data. The terms "John" and "Smith" are very common inside databases that contain names, but the theft of these terms is relatively worthless. In this embodiment, the system is still carefully avoiding storing copies of data of less-common terms of higher value (e.g., credit card numbers, SSN, uncommon names, etc.).

Figure 4:
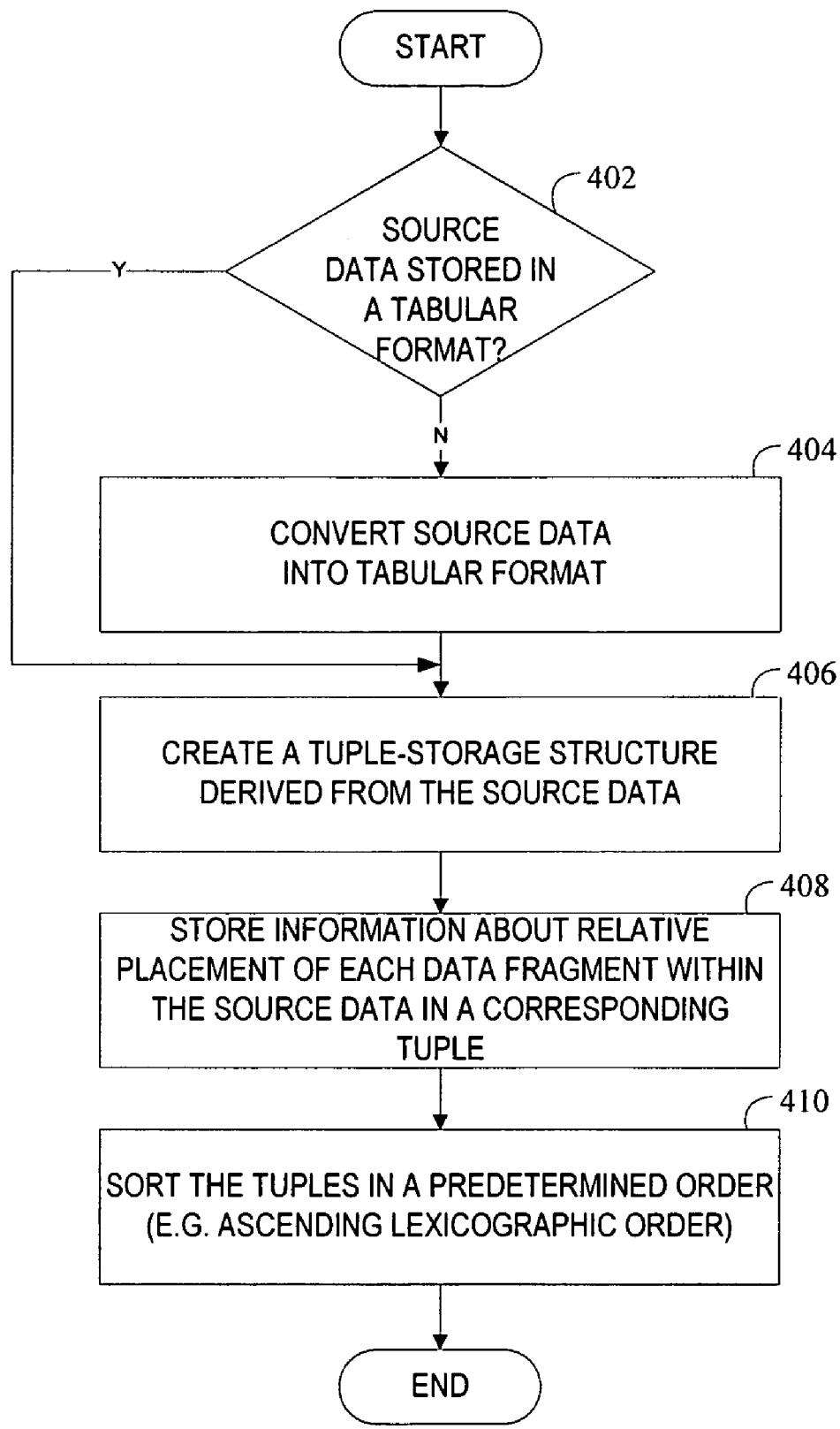
FIG. 4 is a flow diagram of one embodiment of a process for indexing database data.

FIG. 4 is a flow diagram of one embodiment of a process for indexing the source data. The process is performed by processing logic that may comprise hardware (circuitry, dedicated logic, etc.), software (such as is run on a general purpose computer system or a dedicated machine), or a combination of both.

Referring to FIG. 4, processing logic begins with determining whether the source data is stored in a standard tabular format (processing box 402). If not, processing logic converts the source data into a standard tabular format (processing block 404). Each cell in the resulting table stores a fragment of the source data. In one embodiment, each data fragment is a token. A token may be a single word or a cluster of words (e.g., words enclosed in quotation marks). For example, while the word "this" may represent a token stored in a database cell, the phrase "this token" may also represent a standalone token if it is stored as a single string in a database cell.

Next, processing logic creates a tuple-storage structure derived from the source data (processing block 406). A tuple-storage structure provides a mechanism for storing multiple tuples associated with the fragments of the source data. Examples of tuple-storage structures include a hash table, a vector, an array, a tree or a list. Each type of the tuple-storage structure is associated with a method for retrieving a set of tuples for any given content fragment (the set of tuples may be empty if no match is found in the tuple-storage structure).

Further, processing logic stores information about the position of each data fragment within the source data in a corresponding tuple (processing block 408). In one embodiment, the information about the position of a data fragment includes the number of a row storing the data fragment in the source data. In another embodiment, this information also includes the number of a column storing the data fragment in the source data and optionally the data type of the column.

Afterwards, processing logic sorts the tuples in a predetermined order (e.g., in the ascending lexicographic order) (processing block 410).

Thus, the resulting abstract data structure (i.e., the index) only contains information about the relative placement of data records in the context of the larger whole but does not include any fragments of the source data itself.

In one embodiment, the contents of the index are treated cryptographically (e.g., with a hash function or using an encryption function with a cryptographic key) to further secure the index from theft.

Figure 5:
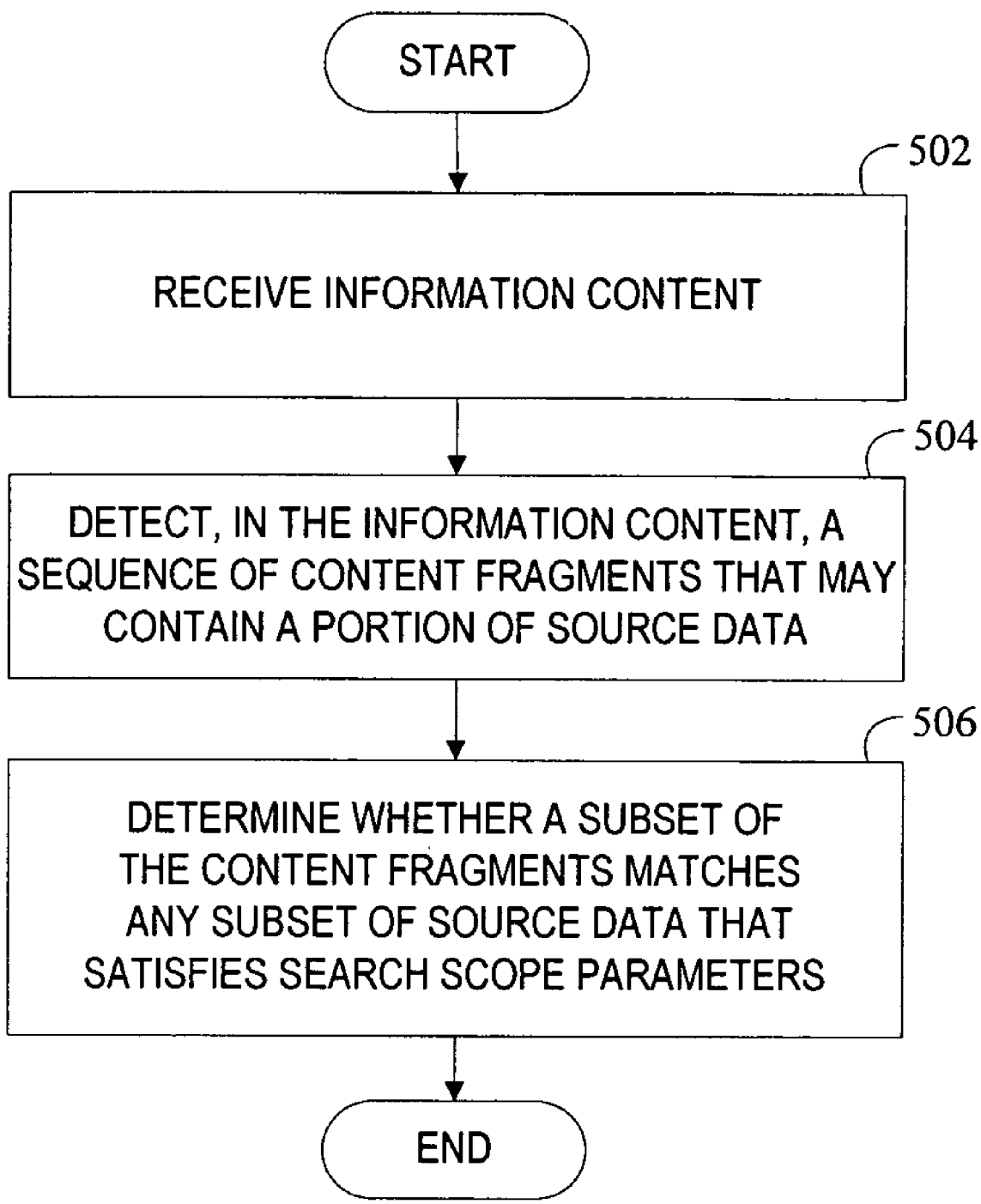
FIG. 5 is a flow diagram of one embodiment of a process for searching information content for preselected data.

Exemplary search techniques will now be described in more detail. FIG. 5 is a flow diagram of one embodiment of a process for searching information content for source data. The process is performed by processing logic that may comprise hardware (circuitry, dedicated logic, etc.), software (such as is run on a general purpose computer system or a dedicated machine), or a combination of both.

Referring to FIG. 5, processing logic begins with identifying information content (processing block 502). The information content includes free-from text and may be included in a file (e.g., an archived email message stored on a hard drive of a computer) or in a block of data transmitted over a network (e.g., an email message transmitted over a network using any type of a network protocol). As discussed above the information content to be searched may be selected based on theft detection conditions specified by the user.

Next, processing logic detects in the information content a sequence of content fragments that may possibly contain a portion of source data (processing block 504). The detected sequence of content fragments may be a set of adjacent or non-adjacent tokens within the information content. Each token may correspond to either a word or a phrase. The detected sequence of content fragments may be a portion of the received information content or the entire information content. In another embodiment, the detected sequence of content fragments is considered as a set of subsets of tokens, in which each subset of tokens may possible contain a portion of source data.

In one embodiment, processing logic decides that a sequence of content fragments may possibly contain a portion of the source data upon determining that the sequence of content fragments resembles column-formatted data. This determination may be made by parsing the received information content to identify separated lines (as may be indicated, for example, by tags <cr> or <cr><lf>) and finding that these separated lines contain a similar number of tokens and optionally the similar data types of the tokens.

In another embodiment, processing logic decides that a sequence of content fragments may possibly contain a portion of the source data upon parsing the entire information content and searching blocks of contiguous tokens for source data. In one embodiment, the blocks of contiguous tokens are defined based on user-specified parameters such as a user-specified width of each block and a user-specified position of each block within the information content (e.g., the user may require that the two adjacent blocks be separated by a certain number of tokens).

In yet another embodiment, processing logic decides that a sequence of content fragments may possibly contain a portion of the source data upon finding in the information content an expression of a predefined format. Such expression may be, for example, an account number, a social security number, a credit card number, a phone number, a postal code, an email address, text formatting indicating a monetary or numeric value (e.g., "$" signs together with digits), etc. Once the expression is found, processing logic decides that a region of text surrounding the expression may possibly contain a portion of the source data. The size of this region may be defined by a predetermined number of tokens on each side of the found expression.

In yet another embodiment, processing logic decides that a sequence of content fragments may possibly contain a portion of the source data upon determining that the word usage or the word distribution in the information content (or in some portion of the information content) resembles a statistical pattern that indicates a possible containment of the source data in the information content.

In still another embodiment, processing logic decides that a sequence of content fragments may possibly contain a portion of the source data upon determining that certain properties associated with the received information content indicate a possible containment of the source data in the information content based on the history of previous violations. These properties may include, for example, the destination of the information content (e.g., a recipient of an electronic message), the origin of the information content, the time of transmission associated with the information content, the size of transmission associated with the information content, the types of files contained in the transmission (e.g., multipurpose Internet mail extension (MIME) types of files), etc. In one embodiment, the history of previous violations is maintained by identifying, for each detection of source data, the properties of the information content in which the source data was detected and recording these properties in a previous violation database. Subsequently, when processing logic decides whether a sequence of content fragments within the new information content may possibly contain a portion of source data, processing logic identifies the properties of the new information content and searches the previous violation database for these properties. If a match is found, processing logic determines whether the previous violations associated with the matching property indicate a possible containment of source data in the new information content. This indication may be based on the number of previous violations associated with the matching property or the frequency of previous violations associated with the matching property. For example, this indication may be based upon the total number of violations that a particular sender has committed, or the frequency of those violations over a given time period.

Afterwards, upon detecting a sequence of content fragments that may possibly contain a portion of the source data, processing logic makes a determination as to whether any subset of these content fragments matches a subset of the source data and is in accordance with the policy parameters discussed above (processing block 506).

Figure 6A:
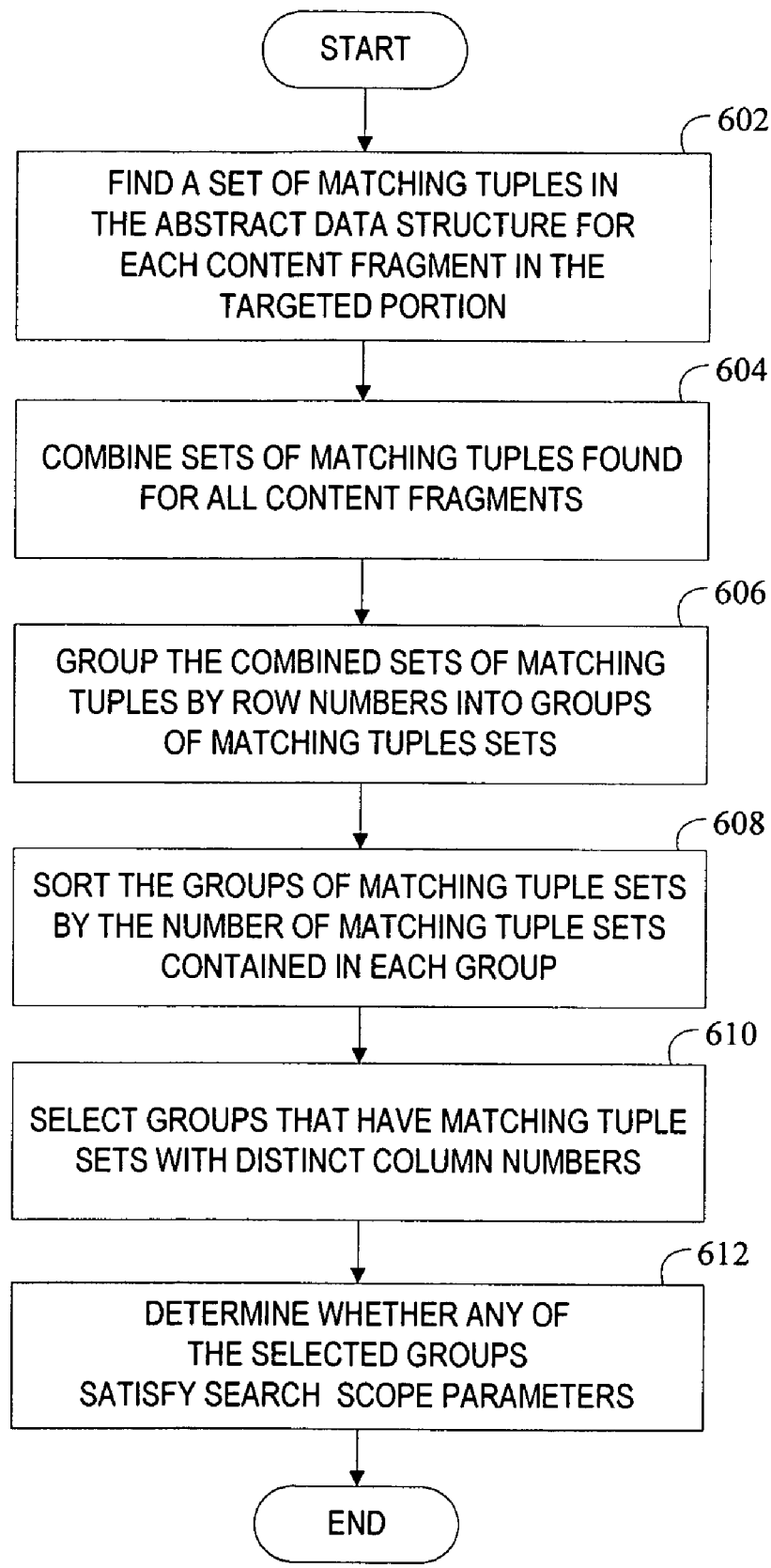
FIGS. 6A-6C are a flow diagram of one embodiment of a process for finding a match for a subset of content fragments in an abstract data structure derived from preselected data.
Figure 6B:
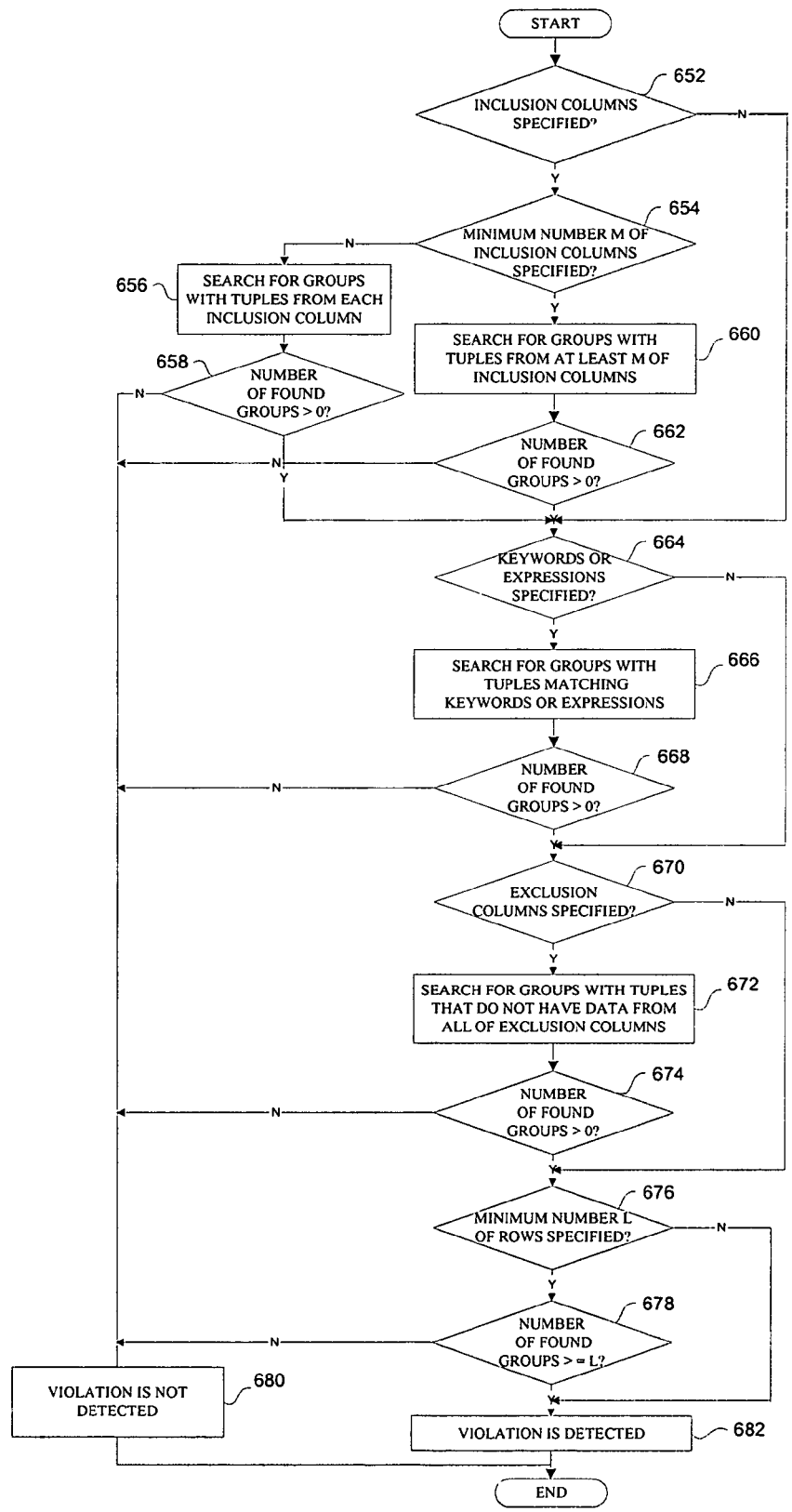
Figure 6C:
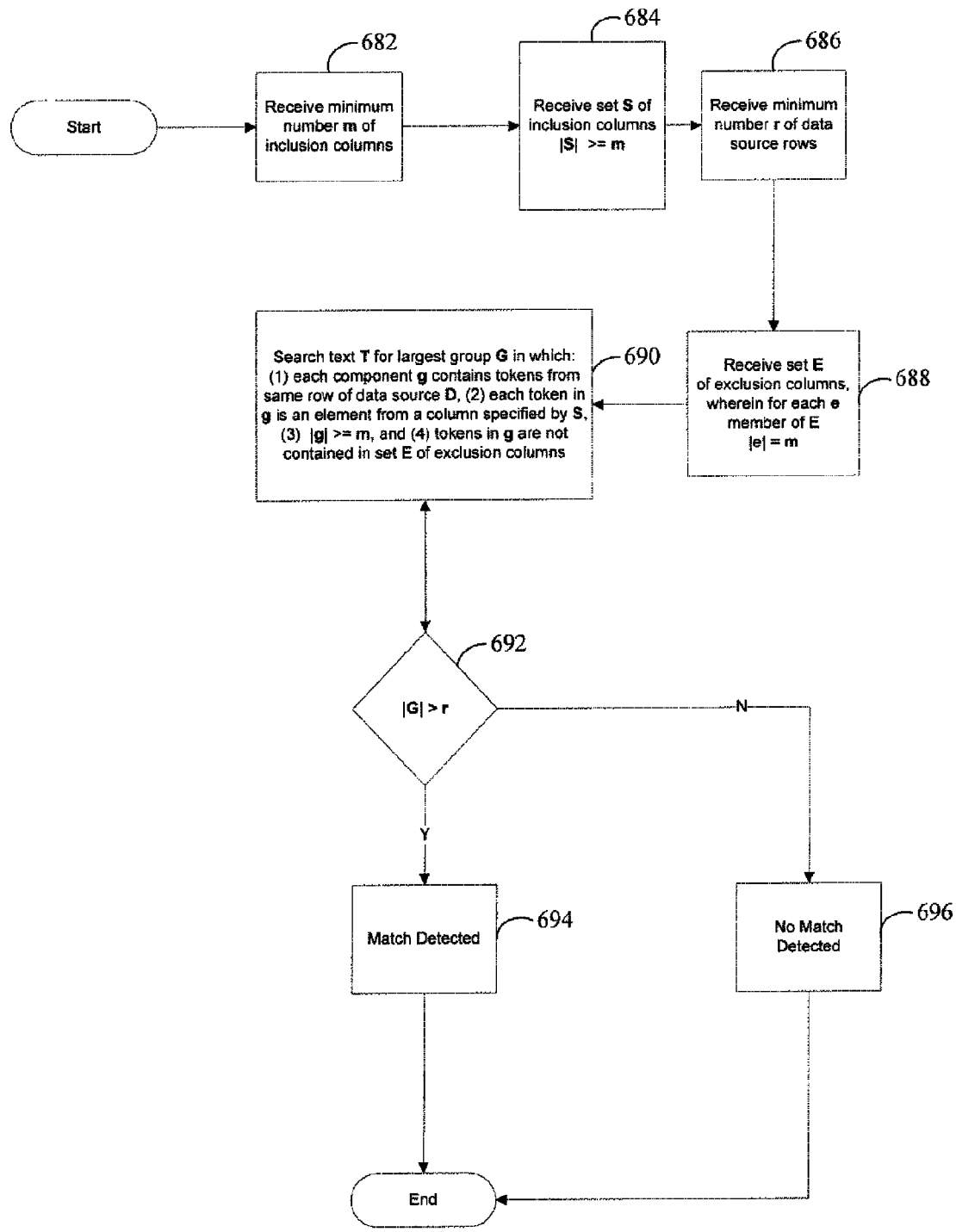

FIGS. 6A-6C are flow diagrams of various exemplary embodiments of a process to find, for a subset of content fragments, a match satisfying policy parameters in an abstract data structure derived from source data. The process is performed by processing logic that may comprise hardware (circuitry, dedicated logic, etc.), software (such as is run on a general purpose computer system or a dedicated machine), or a combination of both.

Referring to FIG. 6A, processing logic begins with parsing the sequence of content fragments identified at processing block 504 of FIG. 5 into content fragments (e.g., tokens). Then, for each content fragment, processing logic searches the abstract data structure for a set of matching tuples (processing block 602). For example, a word "Smith" contained in the information content may have several occurrences in the source data that are reflected in the abstract data structure. Specifically, each of these occurrences has a corresponding tuple in the abstract data structure. During the search, processing logic retrieves a set of tuples corresponding to the occurrences of the word "Smith" in the source data. Each tuple stores information about the position of this data fragment within a database or a table storing the source data. In one embodiment, the positional information includes the row number of a cell storing the data fragment. In another embodiment, the positional information also includes a column number of this cell and optionally the data type of the column.

Next, processing logic combines the matching tuple sets found for all the content fragments (processing block 604) and then groups the combined matching tuple sets by row numbers into groups L (processing block 606). As a result, each group L (referred to herein as an accumulator) contains matching tuple sets that all have the same column number, i.e., the matching tuple sets in each group L correspond to fragments of the source data that all appear to be from the same row in the database.

Further, processing logic sorts the groups L by the number of matching tuple sets contained in each group (processing block 608) and, in one embodiment, selects those groups that have tuple sets with distinct column numbers (processing block 610). Afterwards, processing logic determines whether any of the selected groups satisfy policy parameters (processing block 612).

FIG. 6B illustrates one exemplary embodiment of a process for determining whether any selected groups of tuple sets satisfy policy parameters.

Referring to FIG. 6B, processing logic begins with determining whether the policy parameters specify inclusion columns (decision box 652). If not, processing logic proceeds to decision box 664. If so, processing logic determines whether the policy parameters specify a minimum number M of inclusion columns (decision box 654). If number M is specified, processing logic searches for groups with tuples from at least M number of the inclusion columns (processing block 660) and determines whether any such groups are found (i.e., the number of found groups is greater than 0) (decision box 662). If the determination made at decision box 662 is positive, processing logic proceeds to decision box 664. If the determination made at decision box 662 is negative, processing logic decides that no violation has been detected (processing block 680).

If number M is not specified (decision box 654), processing logic searches for groups with tuples from each specified inclusion column (processing block 656) and determines whether any such groups are found (decision box 658). If the determination made at decision box 658 is positive, processing logic proceeds to decision box 664. If the determination made at decision box 658 is negative, processing logic decides that no violation has been detected (processing block 680).

At decision box 664, processing logic determines whether the policy parameters specify any key words or expressions. If not, processing logic proceeds to decision box 670. If so, processing logic searches for groups with tuples matching the specified keywords or expressions (processing block 666) and determines whether any such groups are found (decision box 668). If the determination made at decision box 668 is positive, processing logic proceeds to decision box 670. If the determination made at decision box 668 is negative, processing logic decides that no violation has been detected (processing block 680).

At decision box 670, processing logic determines whether the policy parameters specify exclusion columns. If not, processing logic proceeds to decision box 676. If so, processing logic searches for groups with tuples that are not from all of the exclusion columns (processing block 672) and determines whether any such groups are found (decision box 674). If the determination made at decision box 672 is positive, processing logic proceeds to decision box 676. If the determination made at decision box 672 is negative, processing logic decides that no violation has been detected (processing block 680).

At decision box 676, processing logic determines whether the policy parameters specify a minimum number L of rows. If not, processing logic decides that a violation is detected (processing block 682). If so, processing logic determines whether the most recent number of found groups is not less than L (decision box 678). If this determination is positive, processing logic decides that a violation is detected (processing block 682). If the determination made at decision box 678 is negative, processing logic decides that no violation has been detected (processing block 680).

FIG. 6C illustrates an alternative exemplary embodiment of a process for determining whether any selected groups of tuple sets satisfy policy parameters.

Referring to FIG. 6C, processing logic begins with receiving parameter m that identifies the minimum number of inclusion columns (i.e., data source columns whose data needs to be included in the search result) (processing block 682).

Next, processing logic receives parameter S specifying the set of inclusion columns and confirms that |S| is greater or equal to m (processing block 684).

At processing block 686, processing logic receives parameter r specifying the minimum number of rows. Parameter r requires that the search result contain data from at least r rows of the source data.

At processing block 688, processing logic receives parameter E specifying a set of exclusion columns (i.e., data source columns whose data has to be excluded from the search result) and confirms that for each e member if E, |e| is equal to m.

At processing block 690, processing logic searches text T for the largest match group G in which:
(a) each components is a subset g of text T that contains tokens from the same row of data source D,
(b) each token from g is an element from a column in D specified by S,
(c) |g|>=m, and
(d) tokens of g do not contain data from exclusion columns E.

At decision box 692, processing logic determines whether |G| is greater than r. If so, processing logic decides that a match is detected (processing block 694). If not, processing logic decides that no match is detected (processing block 696).

Figure 7A:
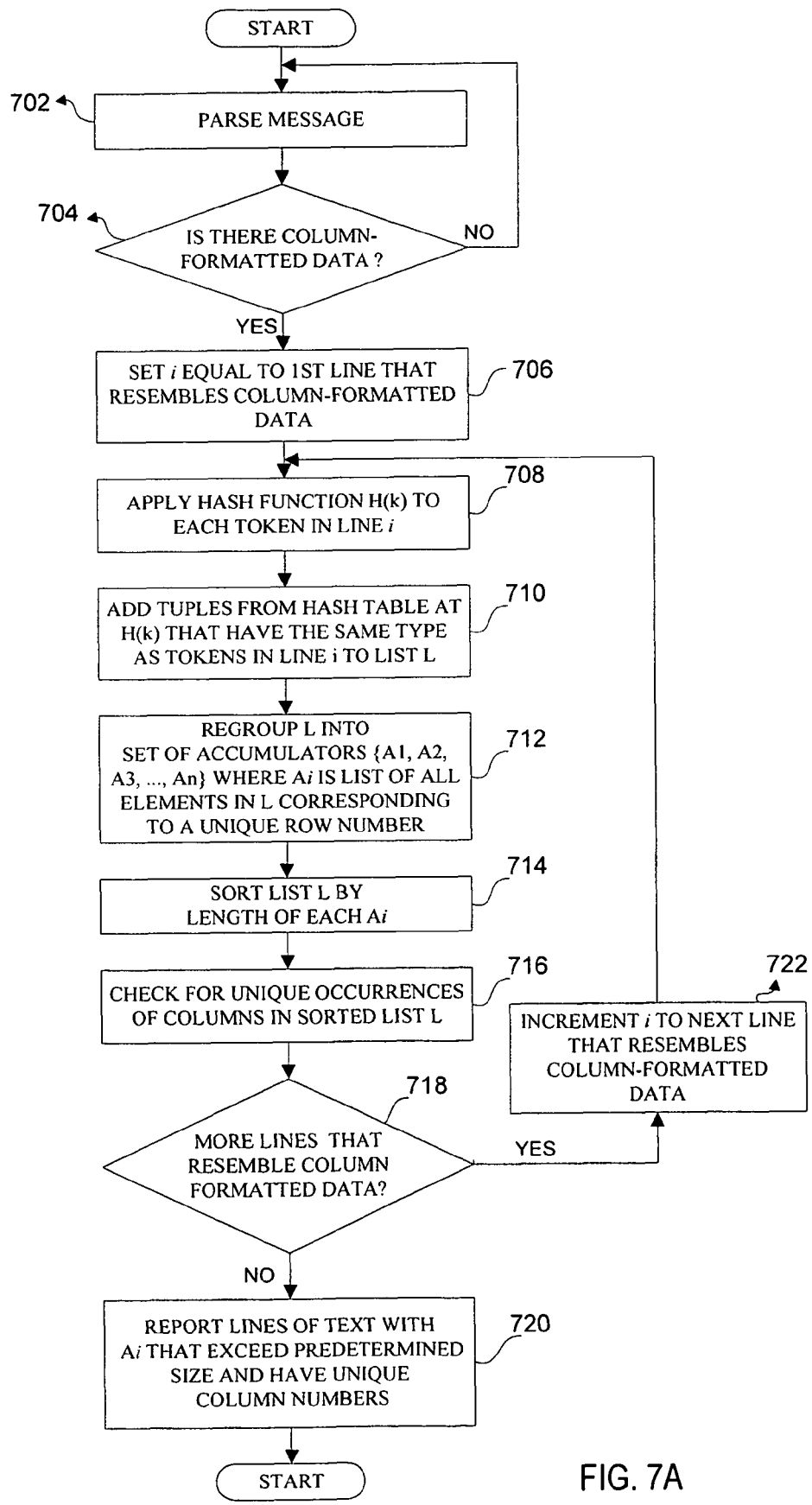
FIGS. 7A-7C are flow diagrams of alternate embodiments of a process for searching an incoming message using a hash table index of preselected data.
Figure 7B:
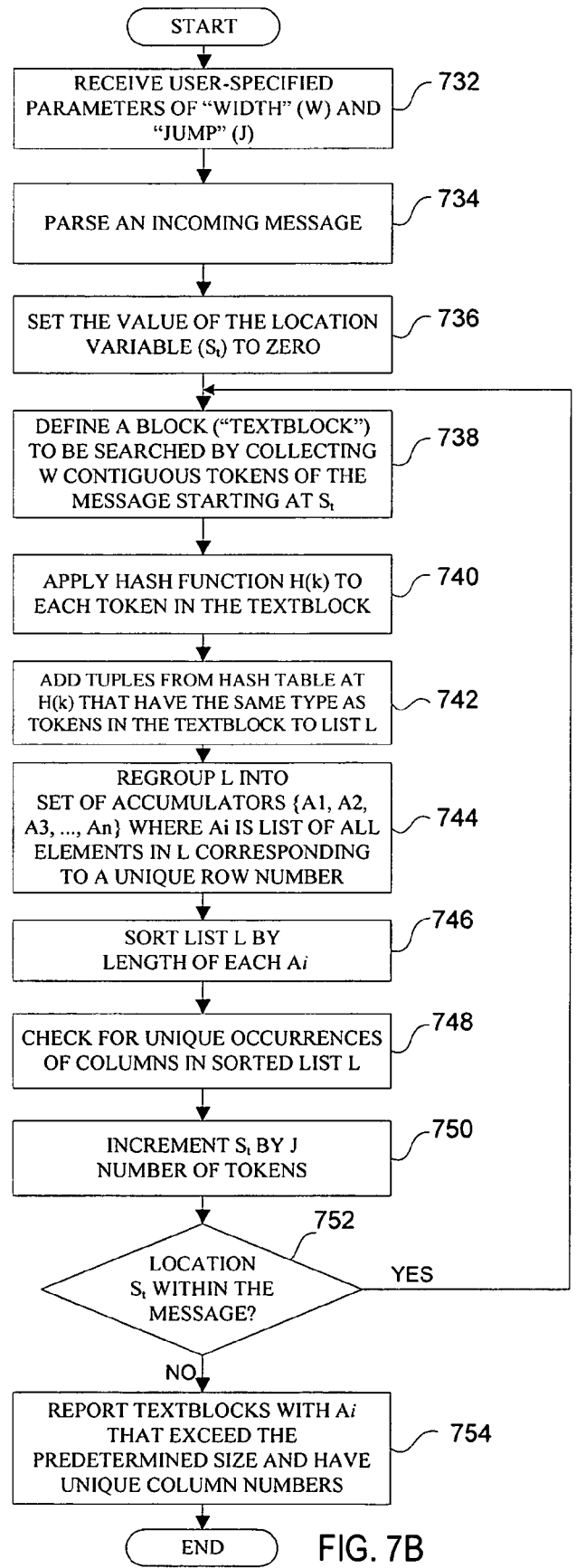
Figure 7C:
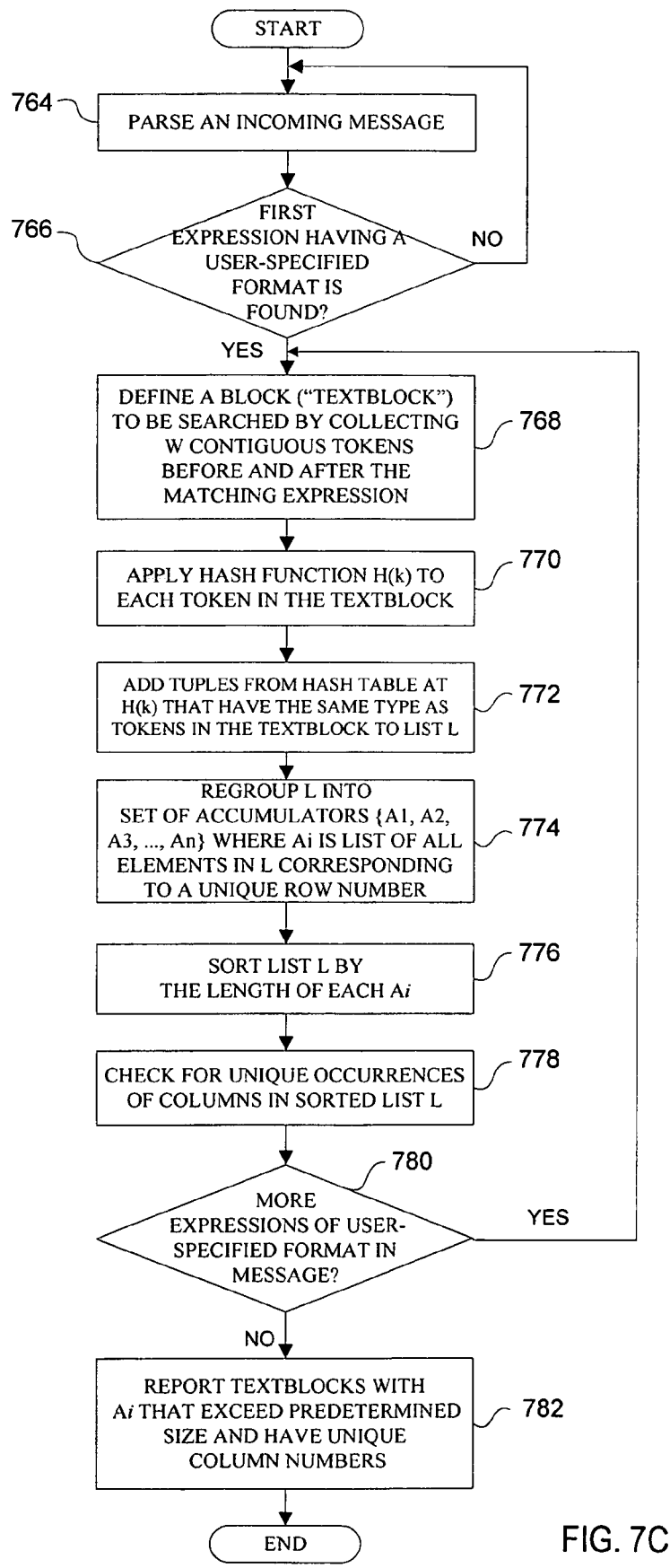

Exemplary embodiments of a search process will now be described. FIGS. 7A-7C are flow diagrams of alternate embodiments of a process for searching an incoming message using a hash table index of source data. The process is performed by processing logic that may comprise hardware (circuitry, dedicated logic, etc.), software (such as is run on a general purpose computer system or a dedicated machine), or a combination of both.

Referring to FIG. 7A, processing logic begins with parsing an incoming message (processing block 702). Next, processing logic determines whether the parsed portions of the incoming message contain column-formatted data (processing box 704). In one embodiment, lexical analysis may be used to identify lines in the parsed portions of the incoming message (e.g., by finding tags <cr> or <cr><lf> that are used to separate lines) and then detecting that the number of tokens found in adjacent lines is identical in number and in type. In one embodiment, processing logic stores the type of each token, along with the total number of tokens.

If the determination made at processing box 704 is negative, processing transitions to processing block 702. Otherwise, processing transitions to processing block 706 where processing logic sets i equal to the first line that resembles column-formatted data.

Next, processing logic applies a hash function H(k) to each token in line i (processing block 708), finds a set of tuples at H(k) in the hash table for each token in line i, adds the tuples to list L, and regroups list L into a set of accumulators (processing block 712) in which each individual accumulator's tuples have the same row number value. Further, processing logic sorts that list L by the length of each Ai (processing block 714) and checks for unique occurrences of columns in sorted list L (processing block 716). At processing block 710, optional pre-processing logic may be performed to filter the tokens before insertion into list L so that only those tuples with type matching the lexical type of the original token k are added to L. It should be noted that in some other embodiments checking for unique occurrences of columns may be skipped for reasons of speed or simplicity. In yet other embodiments, tuples are simple "singletons" containing row numbers only (i.e., no column number and no type indicator).

Afterwards, if the incoming message contains more lines that resemble column-formatted data (processing box 718), processing logic increments i to the next line that resembles column-formatted data (processing block 722) and the process transitions to processing block 706. Otherwise, processing logic reports lines of text with Ai that exceed the predetermined size and have unique column numbers (processing block 720).

Referring to FIG. 7B, processing logic begins with receiving user-specified parameters of "width" (W) and "jump" (J) (processing block 732) and parsing an incoming message (processing block 734). Parameter W specifies the number of contiguous tokens in each block of contiguous tokens that is to be searched during a single iteration and parameter J specifies the required number of tokens between the two adjacent blocks.

Next, processing logic sets the value of the location variable (St) to zero (processing block 736) and defines a block ("textblock") to be searched by collecting W contiguous tokens of the message starting at St (processing block 738).

Further, processing logic applies a hash function H(k) to each token in the textblock (processing block 740), finds a set of tuples at H(k) in the hash table for each token in the textblock, adds the tuples that have the same type as the corresponding tokens in the textblock to list L (processing block 742), regroups list L into a set of accumulators (processing block 744), sorts that list L by the length of each Ai (processing block 746) and checks for unique occurrences of columns in sorted list L (processing block 748).

Afterwards, processing logic increments $S_t$ by J number of tokens (processing block 750) and determines whether location $S_t$ is still within the message (processing box 752). If the determination is positive, the process transitions to processing block 738. Otherwise, processing logic reports textblocks with Ai that exceed the predetermined size and have unique column numbers (processing block 758).

Referring to FIG. 7C, processing logic begins with parsing an incoming message (processing block 764) and looking for a first expression having a user-specified format (processing block 766). Such expression may be, for example, an account number, a social security number, a credit card number, text formatting indicating a monetary or numeric value (e.g., "$" signs together with digits), etc. If the matching expression is not found, the process transitions to processing block 764. Otherwise, the process transitions to processing block 768 where processing logic defines a block ("textblock") to be searched by collecting W contiguous tokens before and after the matching expression. For example, the textblock may consist of 10 tokens immediately preceding the matching expression, the matching expression itself and 10 tokens immediately following the matching expression.

Further, processing logic applies a hash function H(k) to each token in the textblock (processing block 770), finds a set of tuples at H(k) in the hash table for each token in the textblock, adds the tuples that have the same type as the corresponding tokens in the textblock to list L (processing block 772), regroups list L into a set of accumulators (processing block 774), sorts that list L by the length of each Ai (processing block 776) and checks for unique occurrences of columns in sorted list L (processing block 778).

Afterwards, processing logic determines whether the message has anymore expressions of the user-specified format (processing box 780). If this determination is positive, the process transitions to processing block 768. Otherwise, processing logic reports textblocks with Ai that exceed the predetermined size and have unique column numbers (processing block 782).

Handling Messages Containing Pre-selected Data

Figure 8:
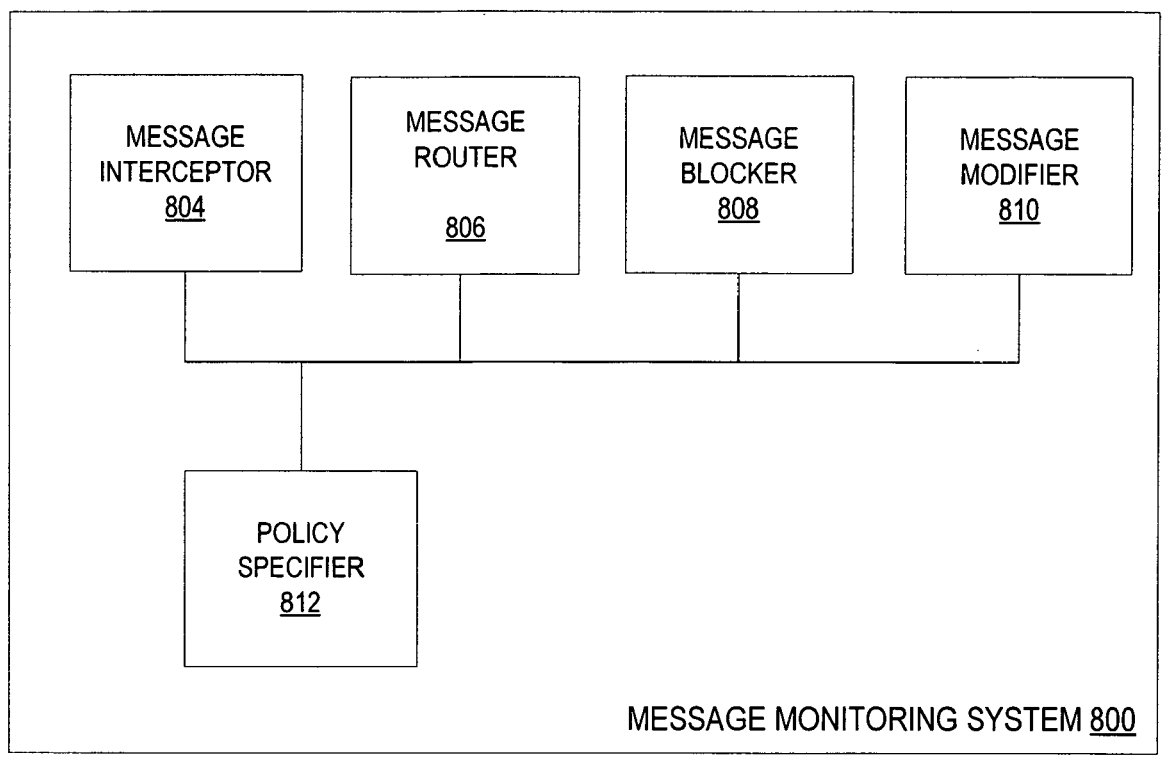
FIG. 8 is a block diagram of one embodiment of a message monitoring system.

FIG. 8 is a block diagram of a message monitoring system (MMS) 800 that is responsible for handling messages containing pre-selected data and preventing unauthorized transmission of the pre-selected data to intended recipients. Messages processed by the MMS 800 may be part of network traffic at any layer of a network stack. For example, these messages may include email messages, instant messaging (IM) messages, messages exchanged during telnet sessions, messages exchanged during file transfer protocol (FTP) sessions, etc. In addition, messages processed by the MMS 800 may be part of different message flow types. For example, these messages may be outbound messages, inbound messages, internal messages, or any combination of the above types.

The MMS 800 includes a message interceptor 804, a message router 806, a message blocker 808, a message modifier 810, and a policy specifier 812.

The message interceptor 804 is responsible for examining messages (e.g., inbound messages, outbound messages and internal messages) and determining whether an intercepted message contains pre-selected data. This determination may be made using any of the search techniques described above. In one embodiment, the message interceptor 804 searches the message for pre-selected data only if an indicator contained in the message header indicates that such a search is needed. For example, the message header may contain a tag indicating that the message is part of marketing material and as such does not need to be scanned for presence of pre-selected data.

The message router 806 is responsible for rerouting an intercepted message containing pre-selected data to a destination other than the recipient. For example, the message router 806 may reroute an intercepted message to a quarantine server that determines whether the message is part of an authorized business process. If so, the message router 806 sends the message to the recipient. If not, the message router 806 invokes a corresponding component of the MMS 800 to apply a protection measure (e.g., blocking, reduction of sensitive data, insertion of a warning, etc.) to the message. In another example, the message router 806 may reroute the message to the supervisor of the message sender to inform the supervisor of the unauthorized transmission. In yet another example, the message router 806 may reroute the message to an archiving server that archives the message in an archive database. In one embodiment, the message router 806 may reroute the message to several of the above destinations (e.g., the quarantine server and the archiving server, or the quarantine server and the supervisor).

In one embodiment, the message router 806 is responsible for re-routing an intercepted message containing pre-selected data through a network segment that has higher levels of channel security (e.g., using virtual private network (VPN) encryption).

The message blocker 808 is responsible for blocking the transmission of the intercepted message containing pre-selected data. In addition, in one embodiment, the message blocker 808 may also send a copy of the message to the supervisor of the message sender, the archiving server, or some other site. In one embodiment, the message blocker 808 is also responsible for informing the message recipient and/or the message sender that the message has been blocked.

In one embodiment, the message blocker 808 blocks the transmission of the message by withdrawing the message from the communication stream. Alternatively, the message blocker 808 may send a signal to a system subsequently processing the message (downstream system), requesting that the transmission of the message be terminated. The downstream system may then inject additional network packets into the communication stream to terminate the transmission of the message containing pre-selected data.

The message modifier 810 is responsible for modifying the intercepted message in real time. As will be discussed in more detail below, the message modifier 810 may amend the body of the message (e.g., to inform the recipient of the sensitive data in the message) or the header of the message (e.g., to inform a system subsequently processing the message of the sensitive data in the message). Once the message is modified, the message router 806 may send the message to the recipient and/or any other destination.

The policy specifier 812 is responsible for receiving user input pertaining to message action policies and defining the message action policies based on the user input. In one embodiment, a message action policy identifies the source of pre-selected data (e.g., the database name, the file name, etc.) and includes a set of rules that specify which information from the pre-selected data should be present in a message to trigger a specific action (e.g., blocking, rerouting, various message modifications, etc.). For example, the set of rules may require that a message be blocked if it contains fragments that match information from specific columns of any single row within the pre-selected data. In another example, the set of rules may also specify a value for a particular column of the pre-selected data to request that a message be re-routed if it contains fragments that match information from any single row of the pre-selected data, the matching information from the single row includes data from the particular column, and this data is equal to the specified value. In yet another example, the set of rules may provide a minimum number of columns to request that the message header be modified if it includes fragments that match information from any single row of the pre-selected data and the information from the single row includes data from at least this number of the specified columns. In still another example, the set of rules may specify exclusion columns to request that the message body be modified if it includes fragments that match information from any single row of the pre-selected data and the information from the single row excludes data from any of the specified exclusion columns. In still another example, the set of rules may specify a minimum number of rows to request that the message be blocked if it includes fragments matching information from at least this number of random rows of the pre-selected data.

In some embodiments, the message action policy includes rules that are applicable to the characteristics of the entire message (e.g., a rule requiring that a sender and/or a recipient of the message satisfy a specific pattern, a rule requiring that the message be carried using a specific protocol, a rule requiring that a destination of the message posted for public discussion match a specific newsgroup name, etc.). In other embodiments, the message action policy includes rules that are applicable to the characteristics of message attachments (e.g., a rule requiring that a message attachment be of a specific type or size, or have a specific file attachment name). In yet other embodiments, the message action policy includes rules requiring a specific action if the message contains a certain keyword(s) or an expression matching a certain regular expression pattern.

In one embodiment, the message action policy contains exception clauses that identify exceptions to this policy's rules. In one embodiment, exceptions clauses declare senders and/or recipients that are authorized to exchange messages containing pre-selected data. For example, according to an exception clause specifying a company's CEO, the presence of pre-selected data specified by the policy's rules will trigger a certain message action (e.g., message blocking) unless the sender or recipient of the message is the CEO. An exception clause may declare individual senders and recipients or senders and recipients across an entire domain or site. An exception clause may also pertain to message headers. For example, an exception clause may declare that a header indicator identifying the message as marketing material should cause the message to be sent to an intended recipient without being scanned for pre-selected data.

In one embodiment, the message action policy includes rules requiring that an action triggered by the presence of pre-selected data in a message possess specific characteristics. These characteristics may include, for example, a desired duration of the action, a desired start time of the action, a desired location for performing the action, etc. For example, the message action policy may require that the presence of certain information from the pre-selected data cause the message to be re-routed to a quarantine server and that the quarantine server keep the message for a specific time period (e.g., a quarantine server should quarantine a message containing financial earnings data until financial earnings are announced).

In one embodiment, the message action policy specifies additional conditions for triggering the specified action. The additional conditions may pertain to historical data associated with the message sender and/or recipient. For example, the additional conditions may require that the message be blocked only after this sender's third transmission of sensitive content.

In one embodiment, the rules in the message action policy are combined using logical connectives of first-order logic (e.g., AND, OR, NAND, NOR, NOT, equivalent, nonequivalent, etc.).

In one embodiment, the policy specifier 812 provides a user interface facilitating user input of rule parameters. In other embodiments, the policy specifier 812 receives rule parameters identified by the user from an Application Programming Interface (API) or via a configuration file formatted in text or a defined data format (e.g., extensible markup language (XML) or binary format).

In alternative embodiments, the MMS 800 does not use message action policies but instead uses a predefined message action (e.g., as specified by the user or defined programmatically) for all intercepted messages, or selects a message action that is programmatically assigned to a characteristic of the violation detected in the message. This characteristic may identify, for example, the type of violation (e.g., severe violation, insubstantial violation, etc.), the number of recorded violations over a predefined time period, (e.g., the number of transmissions of sensitive data by this sender), etc.

Accordingly, some embodiments of the present invention provide the ability to accurately block messages that contain copies of pre-selected data from a tabular data source independent of the order or format of the elements from the source that appear in the searched message.

FIGS. 9-12A are flow diagrams of alternative embodiments of a process for preventing unauthorized transmission of pre-selected sensitive data. The process is performed by processing logic that may comprise hardware (circuitry, dedicated logic, etc.), software (such as is run on a general purpose computer system or a dedicated machine), or a combination of both. In one embodiment, the process is performed by the MMS 800.

Figure 9:
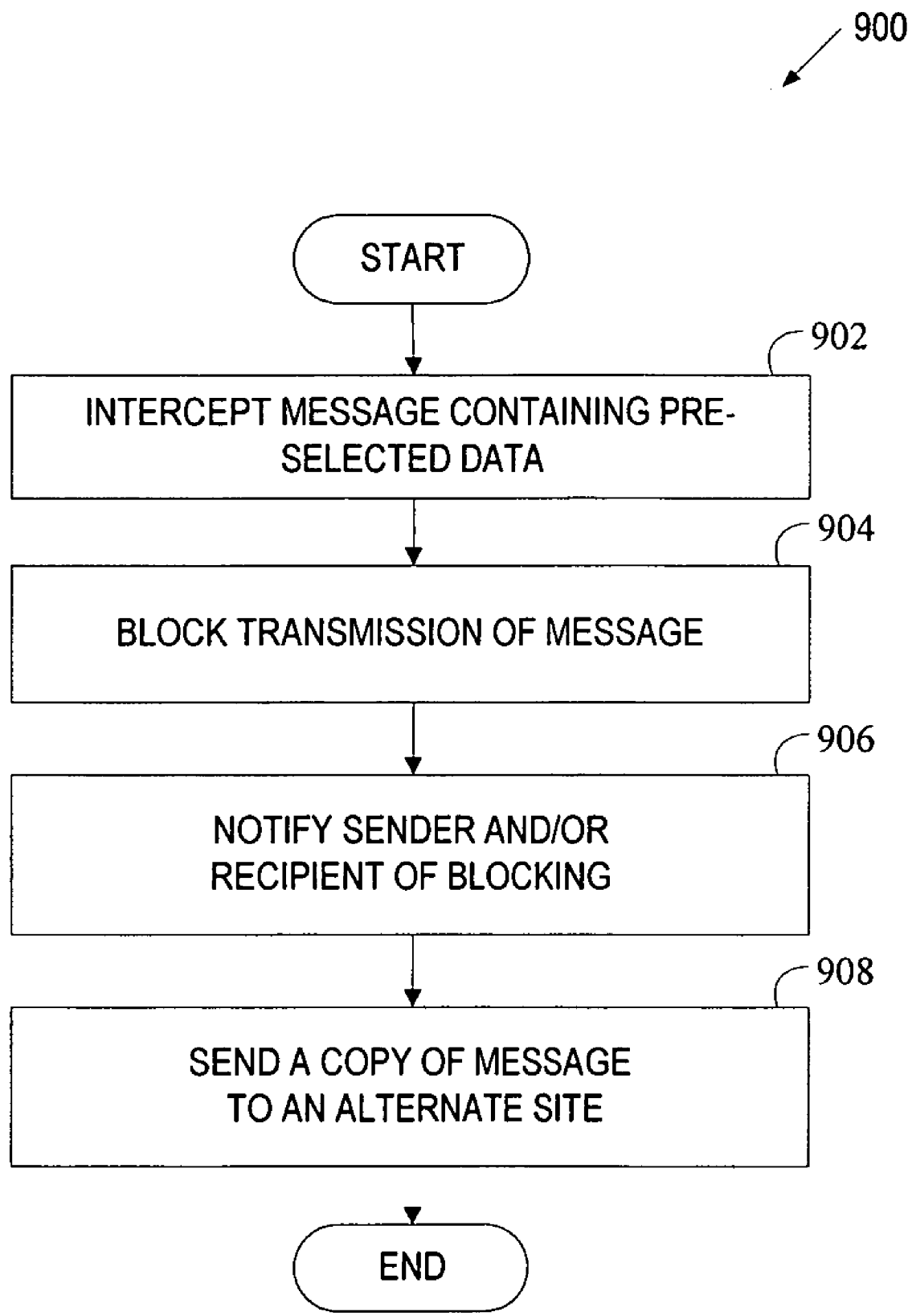

Referring to FIG. 9, processing logic begins with intercepting a message and determining that the intercepted message contains pre-selected data (processing block 902). The intercepted message may be sent by a sender within an organization to a recipient outside of the organization. Alternatively, the intercepted message may be sent by a sender outside the organization to a recipient within the organization. Yet alternatively, the intercepted message may be sent to a sender within the organization to a recipient within the organization.

Next, processing logic blocks the transmission of the message (processing block 904). The transmission of the message may be blocked by removing the message from the communication stream or injecting additional network packets into the communication stream to terminate the transmission of the message. Alternatively, processing logic may provide an indication of the presence of pre-selected data to a system subsequently processing the message, which will then inject into the communication stream additional network packets that terminate the transmission of the message. Processing logic may provide this indication by sending a signal to the downstream system or adding a warning to the message (e.g., by setting a flag in the message header).

At processing block 906, in one embodiment, processing logic notifies the message recipient and/or sender of the blocking (processing block 906).

At processing block 908, in one embodiment, processing logic sends a copy of the message to an alternate site. For example, the copy of the message may be sent to the sender's supervisor or the archiving server.

Figure 10:
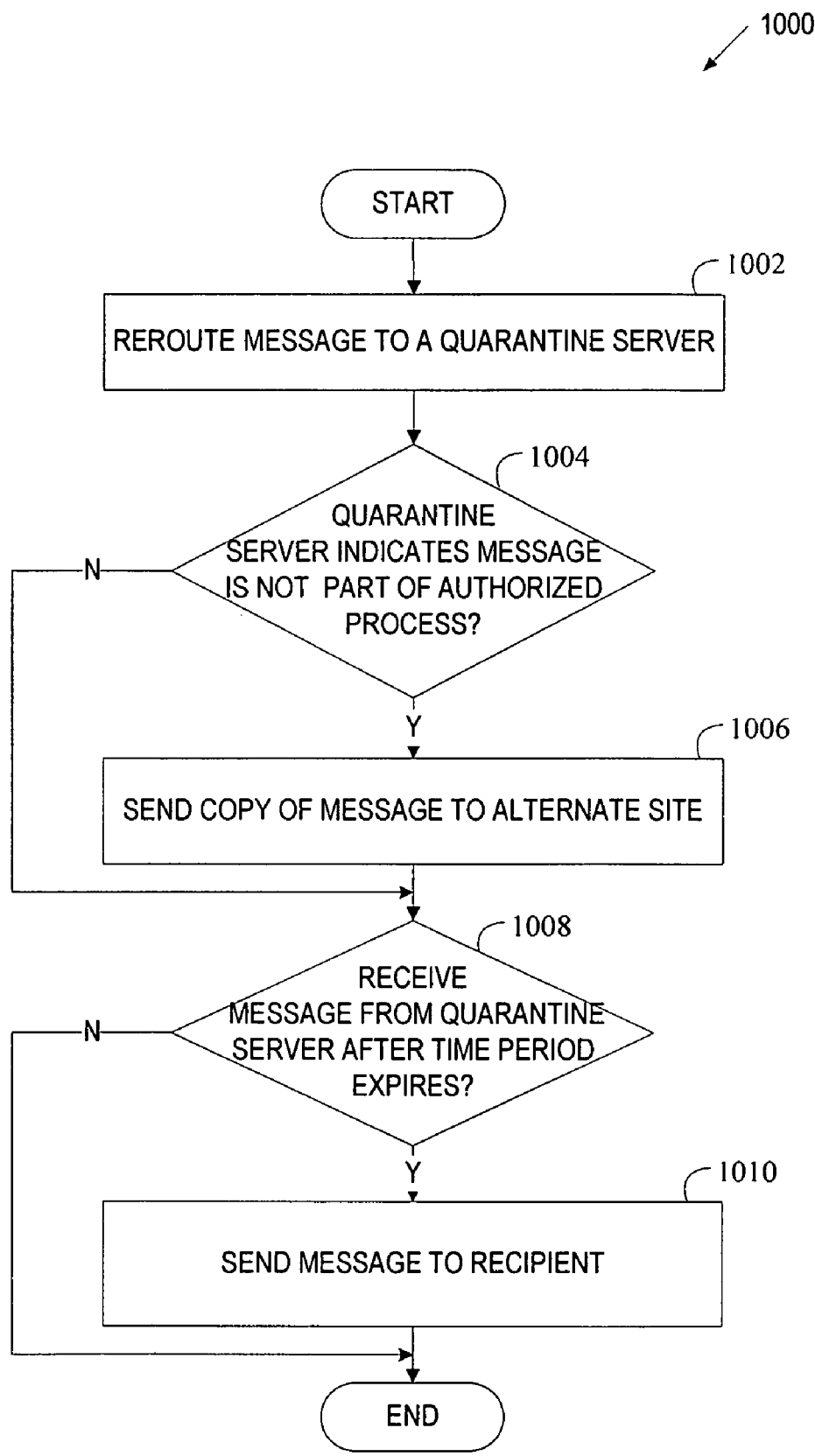

Referring to FIG. 10, processing logic begins with intercepting a message, determining that the intercepted message contains pre-selected data, and re-routing the intercepted message to a quarantine server (processing block 1002). The quarantine server may then decide whether the message is part of an authorized business process. This decision can be made based on input provided by a security analyst or by a program running on the quarantine server. If the quarantine server indicates that the message is not part of an authorized process (processing block 1004), processing logic sends a copy of the message to an alternate site (e.g., the sender's supervisor or the archiving server) (processing block 1006).

The quarantine server may keep the message for some period of time or until a specified time or event. For example, the quarantine server may keep a message containing a company's financial earnings data until the company has the formal announcement of this data.

When the quarantine expires, processing logic receives the message back from the quarantine server (processing block 1008), and sends the message to the intended recipient (processing block 1010).

Figure 11:
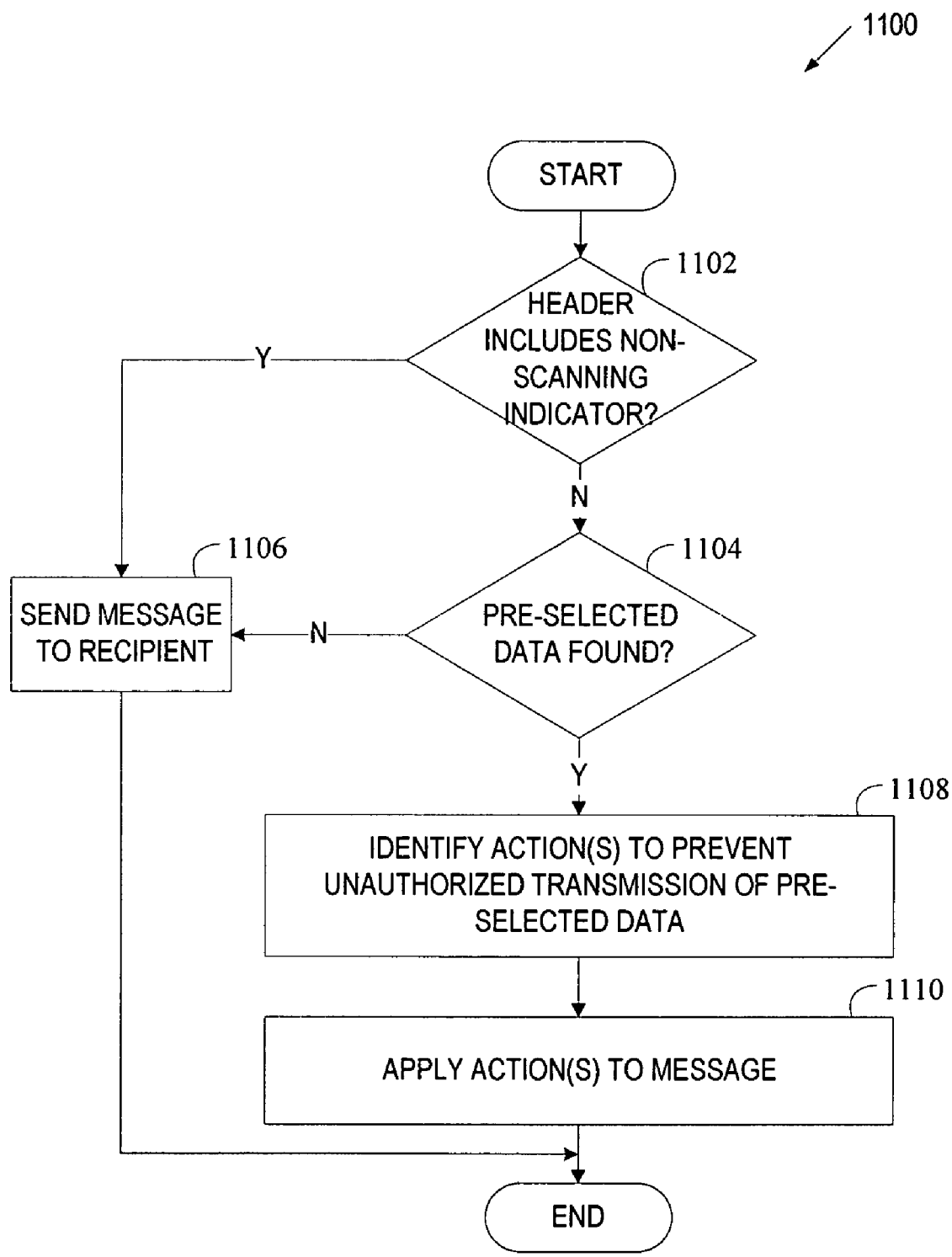

Referring to FIG. 11, processing logic begins with determining whether the header of the message includes a non-scanning indicator (processing block 1102). A non-scanning indicator may be included in the message header to specify that the message does not need to be searched for pre-selected data (e.g., if the message is part of marketing material).

If the message header includes a non-scanning indicator, processing logic sends the message to the recipient regardless of the presence of pre-selected data (processing block 1106). Alternatively, processing logic scans the message and determines whether the message contains pre-selected data (processing block 1104).

If the message does not contain pre-selected data, processing logic sends the message to the recipient (processing block 1106). Otherwise, if the message contains pre-selected data, processing logic identifies one or more actions that should be applied to the message to prevent the unauthorized transmission of pre-selected data (processing block 1108). The actions may include, for example, message blocking, message re-routing to an alternate site (e.g., quarantine server, archiving server, sender's supervisor, etc.), message re-routing through a network segment that has higher levels of channel security (e.g., using VPN encryption), message modification, etc.

In one embodiment, the actions to be applied to the message are defined by the user or programmatically defined based on the type of violation (e.g., severe violation, insubstantial violation, etc.), the number of violations detected in the message (e.g., the number of sensitive data items, the number of individuals whose sensitive information is included in the message, etc.), or any other characteristic of the detected violation. In another embodiment, the actions to be applied to the message are programmatically defined based on historical data associated with the sender and/or recipient of the messages. For example, if the number of violations associated with a specific sender exceeds a threshold, the current message should be blocked; if not, the current message should be re-routed to a quarantine server. In yet another embodiment, the actions to be applied to the message are specified by a message action policy as will be discussed in more detail below in conjunction with FIG. 12.

At processing block 1110, processing logic applies the action(s) identified at processing block 1108 to the messages.

Figure 12A:
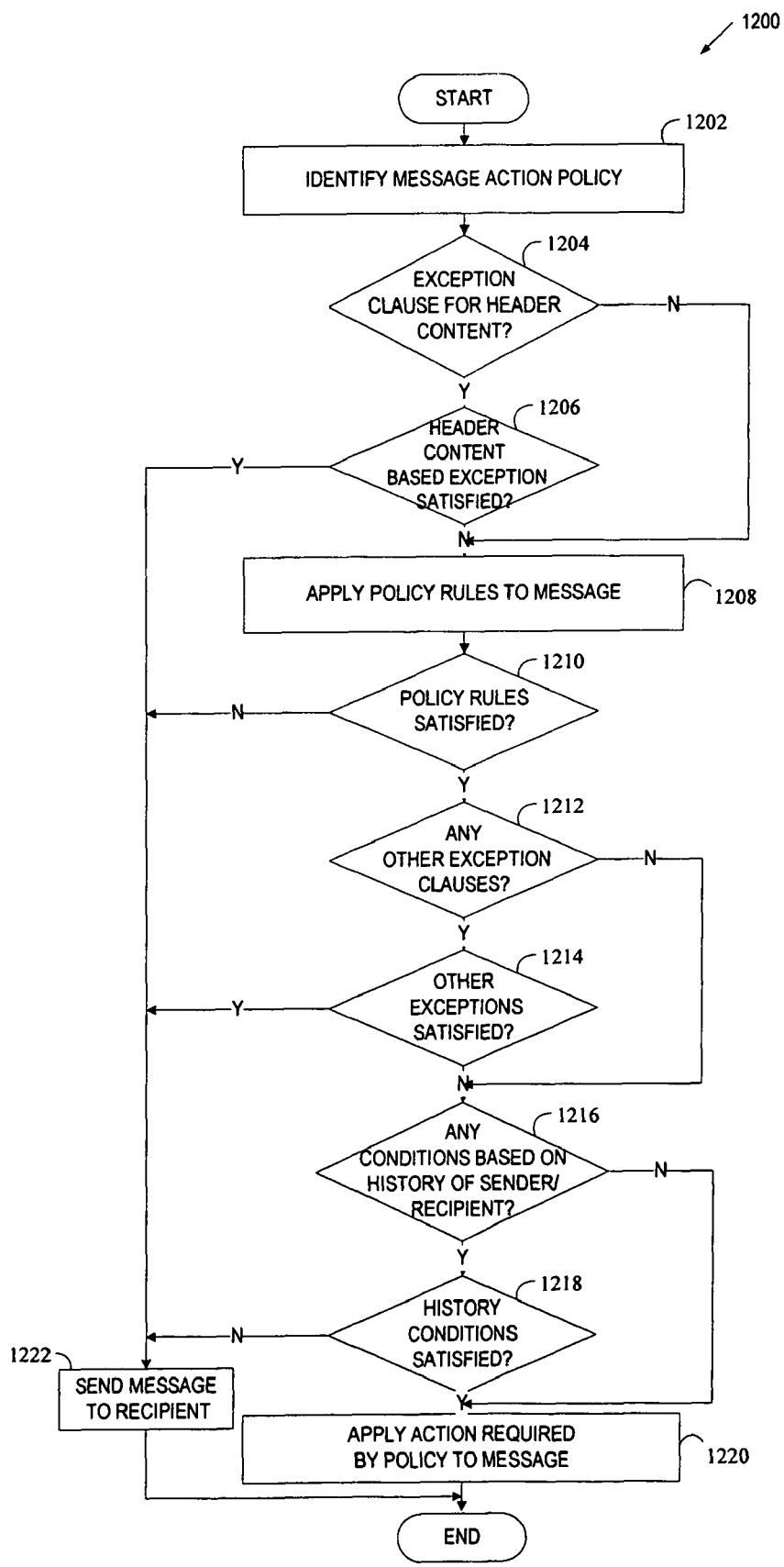

Referring to FIG. 12A, processing logic begins with identifying a message action policy (processing block 1202). As discussed above, the message action policy may include a set of rules pertaining to pre-selected data that specify which information from the pre-selected data should be present in the message to trigger a specific action. In addition, in one embodiment, the message action policy may include exception clauses that declare exceptions to the above rules. These exceptions may include, for example, a header content-based exception requiring that a message be searched for pre-selected data only if the message header contains a scanning indicator. Another exception may specify a sender and/or recipient that are authorized to exchange messages with pre-selected data. Further, in one embodiment, the message action policy may specify additional conditions for triggering an action required by the rules. The additional conditions may pertain to historical data associated with the sender and/or the recipient of the message. For example, an additional condition may require that an action specified by the rules take place only after a third transmission of pre-selected data by a single sender.

At processing block 1204, processing block determines whether the message action policy contains a header content based exception clause. If not, processing logic proceeds to processing block 1208. If so, processing logic further determines whether the header content-based exception is satisfied (processing block 1206).

If the header content-based exception is satisfied, processing logic sends the message to the recipient without searching the message for pre-selected data as specified by the policy rules (processing block 1222). Alternatively, if the header content-based exception is not satisfied, processing logic applies the policy rules to the message (processing block 1208). As discussed above, the policy rules may require that an action be applied to the message if it contains fragments that match information from specific columns of any single row within the pre-selected data. Alternatively, the policy rules may require that an action be applied to the message if it contains fragments that match information from any single row of the pre-selected data, the matching information from the single row includes data from a particular column, and this data is equal to a specified value. In another example, the policy rules may require that an action be applied to the message if it includes fragments that match information from any single row of the pre-selected data and the information from the single row includes data from at least a certain number of the specified columns. In still another example, the policy rules may require that an action be applied to the message if it includes fragments that match information from any single row of the pre-selected data and the information from the single row excludes data from any of the specified exclusion columns. In still another example, the policy rules may require that an action be applied to the message if it includes fragments matching information from at least a certain number of random rows of the pre-selected data.

In some embodiments, the message action policy includes rules that are applicable to the characteristics of the entire message (e.g., a rule requiring that a sender and/or a recipient of the message satisfy a specific pattern, a rule requiring that the message be carried using a specific protocol, a rule requiring that a destination of the message posted for public discussion match a specific newsgroup name, etc.). In other embodiments, the message action policy includes rules that are applicable to the characteristics of message attachments (e.g., a rule requiring that a message attachment be of a specific type or size, or have a specific file attachment name). In yet other embodiments, the message action policy includes rules requiring a specific action if the message contains a certain keyword(s) or an expression matching a certain regular expression pattern.

At processing block 1210, processing logic determines whether the policy rules are satisfied. If not, processing logic sends the message to the recipient (processing block 1222). If so, processing logic determines whether the policy includes any additional exception clauses (processing block 1212).

If the policy does not include any additional exception clauses (e.g., a clause specifying an exception for a group of recipients), processing logic proceeds to processing block 1216. If the policy includes an additional exception clause (e.g., a clause specifying an exception for a group of recipients), processing logic determines whether this exception clause is satisfied (processing block 1214). If so, processing logic sends the message to the recipient (processing block 1222). If not, processing logic determines whether the policy includes any conditions based on prior history of the sender and/or recipient (processing block 1216).

If the policy does not include any conditions, processing logic proceeds to processing block 1220. If the policy includes a condition based on prior history of the sender and/or recipient, processing logic determines whether this condition is satisfied (processing block 1218). If not, processing logic sends the message to the recipient (processing block 1222). If so, processing logic applies the action the required by the policy rules to the message (processing block 1220).

Figure 12B:
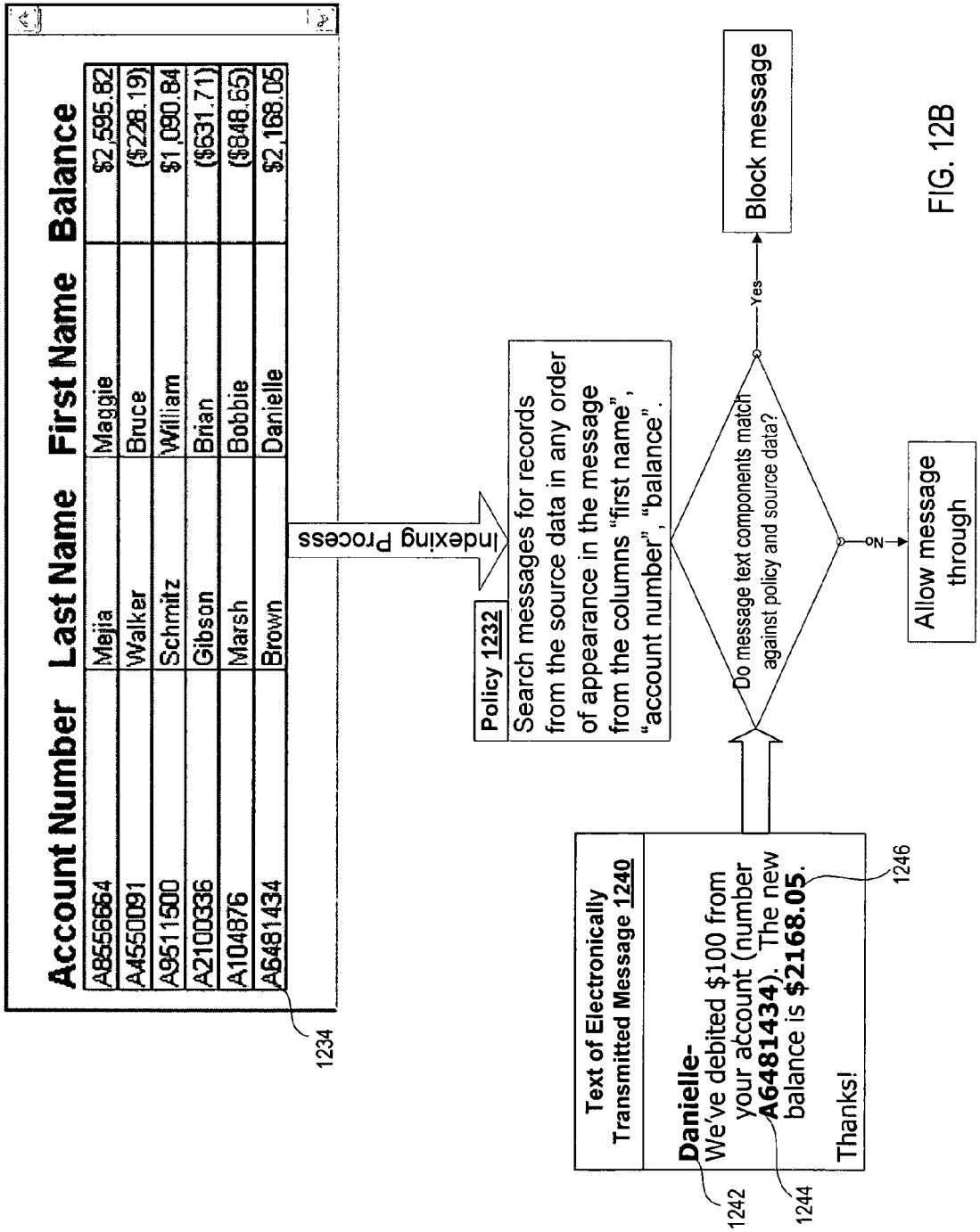
FIG. 12B illustrates a process of handling an email message based on a specific policy.

FIG. 12B illustrates a process of handling an email message based on a specific policy. As shown, exemplary pre-selected source data 1230 includes an account number column, a last name column, a first name column and a balance column. Policy 1232 requires that an email message be blocked if it contains data fragments from a single row of the source data 1230 and these data fragments include information from the first name column, the account number column and the balance column, appearing in the message in any order.

Message 1240 includes data fragments 1242, 1244 and 1246 from row 1234 of the source data 1230 that are from the columns specified by the policy 1232. Hence, the message 1240 will be blocked.

Modifying a Message Based on Presence of Pre-selected Data

As discussed above, the MMS 800 of FIG. 8 searches messages for pre-selected data. Messages processed by the MMS 800 may be part of network traffic at any layer of a network stack. For example, these messages may include email messages, instant messaging (IM) messages, messages exchanged during telnet sessions, messages exchanged during file transfer protocol (FTP) sessions, etc. In addition, messages processed by the MMS 800 may be part of different message flow types. For example, these messages may be outbound messages, inbound messages, internal messages, or any combination of the above types.

In one embodiment, the MMS 800 includes a message modifier 810 that modifies messages depending on the presence of pre-selected data. In particular, in one embodiment, if a message does not contain pre-selected data, the message modifier 810 adds information indicating the lack of pre-selected data to the message. This information may be added to the body of the message to inform the recipient or to the header of the message to inform a system subsequently processing the message (e.g., to inform an archiving system archiving messages that do not contain sensitive data).

If a message contains pre-selected data, the message modifier 810 may perform different types of message modifications. The types of message modifications may be predefined by the user, programmatically defined based on the characteristics of present pre-selected data and/or characteristics of a sender/recipient, or specified by a message action policy.

The types of message modifications may include modifications of the message header, modifications of the message subject line, and modifications of the message body. The message header may be modified to inform a system subsequently processing the message of the presence of pre-selected data. This downstream system may then apply a certain action to the message in addition to, or instead of, sending the message to its intended recipient(s). For example, an archiving system may detect a pre-selected data indicator in the message header, and then refrain from archiving the message. In another example, a downstream system may detect a pre-selected data indicator in the message header, and then inject into the communication stream additional network packets that terminate the transmission of the message. In yet another example, a downstream system may detect a pre-selected data indicator in the message header, and then encrypt the body of the message. In still another example, a client mail application may find a pre-selected data indicator in the message header, and then add a warning (e.g., "This message is confidential") to the message.

The subject line of the message may be modified to inform the recipient of the presence of pre-selected data. For example, a warning of the message sensitivity may be added to the subject line of the message.

The body of the message may also be modified to inform the recipient of the presence of pre-selected data. For example, a warning of the message sensitivity may be added to the body of the message. Alternatively, the body of the message that contains sensitive information may be reconstituted as an attachment, and the new message body may be re-written to indicate that the attachment contains sensitive information. In yet another example, a substitute message may be sent in lieu of the original. The substituted message may contain a secure link pointing back to a cached copy of the original. The secure link may require appropriate authentication and ensure channel security via a protocol such as Secure Sockets Layer (SSL) communications protocol. In still another example, the pre-selected data in the message may be redacted (e.g., relevant message tokens may be blacked, deleted, overwritten with some data, etc.).

The type of message modification that should be applied to a message may be specified by a message action policy. In one embodiment, a message action policy includes a set of rules that specify which information from the pre-selected data should be present in a message to trigger a specific message modification (e.g., header modification, subject line modification, body modification, etc.). For example, the set of rules may require that a certain message modification be performed if the message contains fragments that match information from specific columns of any single row within the pre-selected data. In another example, the set of rules may require that a certain message modification be performed if the message contains fragments that match information from any single row of the pre-selected data, the matching information from the single row includes data from a particular column, and this data is equal to a specified value. In yet another example, the set of rules may require that a certain message modification be performed if the message includes fragments that match information from any single row of the pre-selected data and the information from the single row includes data from at least a certain number of specified columns. In still another example, the set of rules may require that a certain message modification be performed if the message includes fragments that match information from any single row of the pre-selected data and the information from the single row excludes data from any of specified exclusion columns. In still another example, the set of rules may require that a certain message modification be performed if the message includes fragments matching information from at least a certain number of random rows of the pre-selected data.

In some embodiments, the message action policy includes rules that are applicable to the characteristics of the entire message (e.g., a rule requiring that a sender and/or a recipient of the message satisfy a specific pattern, a rule requiring that the message be carried using a specific protocol, a rule requiring that a destination of the message posted for public discussion match a specific newsgroup name, etc.). In other embodiments, the message action policy includes rules that are applicable to the characteristics of message attachments (e.g., a rule requiring that a message attachment be of a specific type or size, or have a specific file attachment name). In yet other embodiments, the message action policy includes rules requiring a specific action if the message contains a certain keyword(s) or an expression matching a certain regular expression pattern.

In one embodiment, the message action policy contains exception clauses that identify exceptions to this policy's rules. In one embodiment, exceptions clauses declare senders and/or recipients that are authorized to exchange messages containing pre-selected data. For example, according to an exception clause specifying a company's CEO, the presence of pre-selected data specified by the policy's rules will trigger a certain message modification unless the sender or recipient of the message is the CEO. An exception clause may declare individual senders and recipients or senders and recipients across an entire domain or site. An exception clause may also pertain to message headers. For example, an exception clause may declare that a header indicator identifying the message as marketing material should cause the message to be sent to an intended recipient without being scanned for pre-selected data.

In one embodiment, the message action policy specifies additional conditions for triggering the specified modification. The additional conditions may pertain to historical data associated with the message sender and/or recipient. For example, the additional conditions may require that the message body be modified after this sender's third transmission of sensitive content.

FIGS. 13-16A are flow diagrams of alternative embodiments of a process for modifying messages based on presence of pre-selected data. The process is performed by processing logic that may comprise hardware (circuitry, dedicated logic, etc.), software (such as is run on a general purpose computer system or a dedicated machine), or a combination of both. In one embodiment, the process is performed by the MMS 800.

Figure 13:
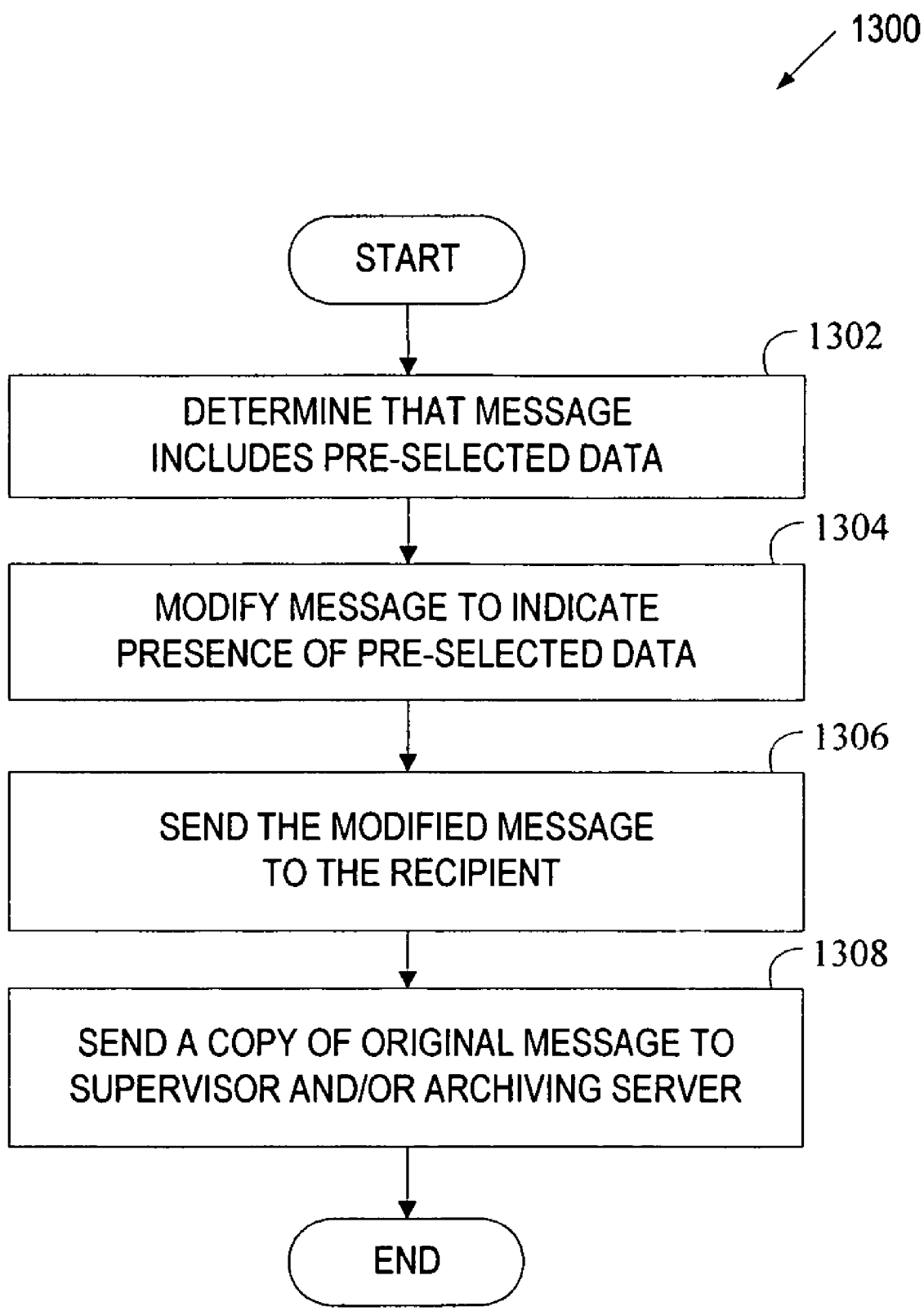

Referring to FIG. 13, processing logic begins with determining that a intercepted message contains pre-selected data (processing block 1302).

At processing block 1304, processing logic modifies the message to indicate the presence of pre-selected data. In one embodiment, processing logic modifies the header of the messages. In another embodiment, processing logic modifies the body of the messages. In yet another embodiment, processing logic modifies the subject line of the messages.

At processing block 1306, processing logic sends the modified message to the recipient. In addition, in one embodiment, processing logic sends a copy of the original message to the sender's supervisor and/or the archiving system (processing block 1308). Processing logic may only send the copy of the original message to the sender's supervisor and/or the archiving system if it is required by the relevant policy.

Figure 14:
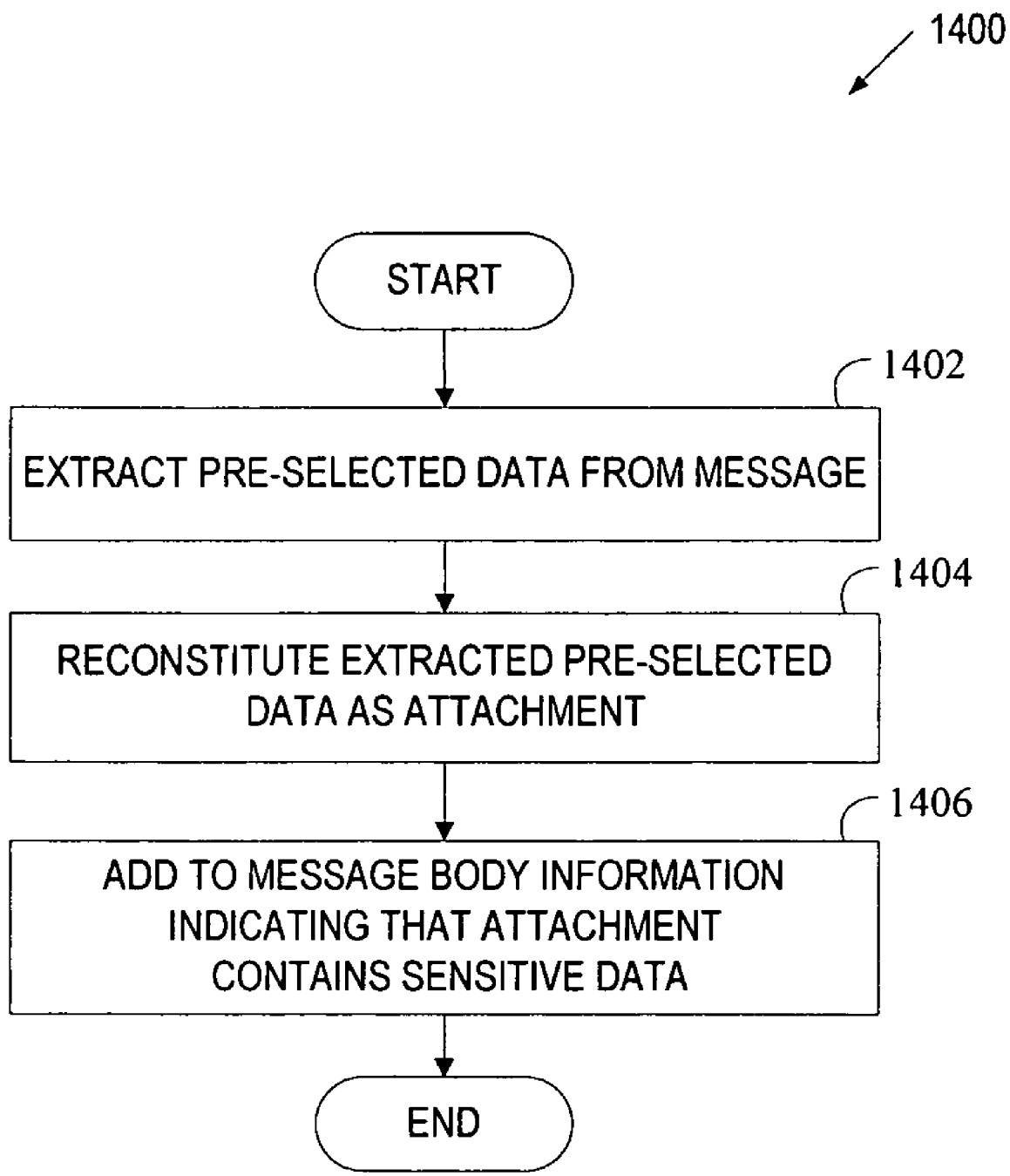

Referring to FIG. 14, processing logic begins with detecting pre-selected data in the body of a message and extracting the pre-selected data from the message body (processing block 1402).

At processing block 1406, processing logic reconstitutes the extracted pre-selected data as an attachment. In an alternative embodiment, processing logic reconstitutes the entire message body containing pre-selected data as an attachment.

At processing block 1408, processing logic adds a warning to the message body, indicating that the attachment contains sensitive data.

Figure 15:
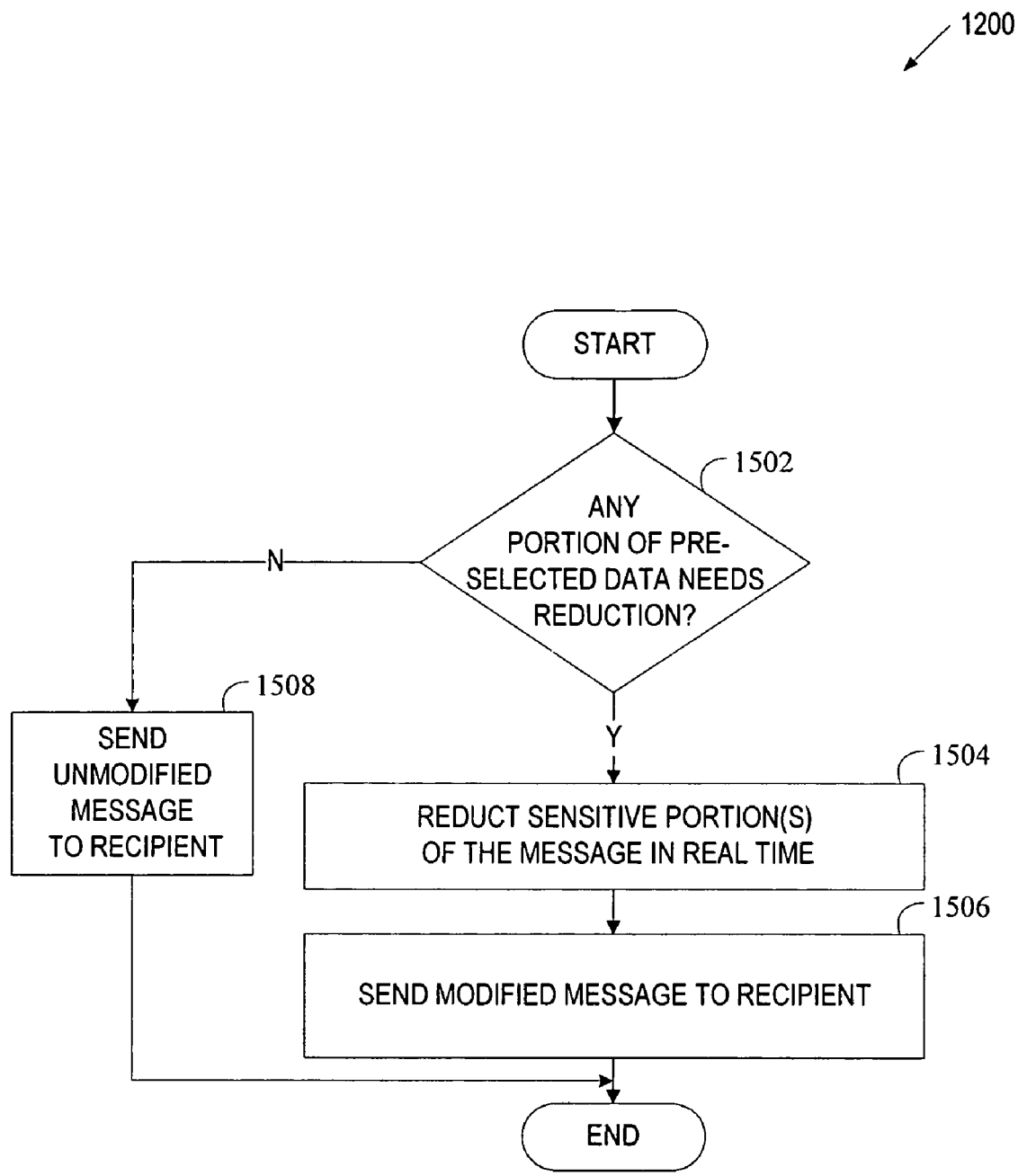

Referring to FIG. 15, processing logic begins with detecting pre-selected data in a message and determining whether any portion of this pre-selected data needs redaction (processing block 1502). This determination can be made based on predefined rules (e.g., a social security number should be redacted while the place of birth should not). If no redaction is needed, processing logic sends the message to the recipient without any modifications (processing block 1508). Alternatively, if at least a portion of the pre-selected data needs to be redacted, processing logic redacts this sensitive portion of the pre-selected data in real time (processing block 1504) and sends the resulting message to the recipient (processing block 1506). The redaction may include, for example, blacking out the relevant message tokens, deleting the relevant message tokens, overwriting the relevant message token with some data, etc. In another example, the redaction may include the removal of the entire attachment containing pre-selected data.

Referring to FIG. 16, processing logic begins with identifying a message action policy (processing block 1602). As discussed above, the message action policy may include a set of rules pertaining to pre-selected data that specify which information from the pre-selected data should be present in the message to trigger a specific message modification. In addition, in one embodiment, the message action policy may include exception clauses that declare exceptions to the above rules. These exceptions may include, for example, a header content-based exception requiring that a message be searched for pre-selected data only if the message header contains a scanning indicator. Another exception may specify a sender and/or recipient that are authorized to exchange messages containing pre-selected data. Further, in one embodiment, the message action policy may specify additional conditions for triggering a message modification required by the rules. The additional conditions may pertain to historical data associated with the sender and/or the recipient of the message. For example, an additional condition may require that a message modification specified by the rules take place only after a third transmission of pre-selected data by a single sender.

At processing block 1604, processing block determines whether a header content-based exception contained in the policy is satisfied. If so, processing logic sends the original message to the recipient without searching the message for pre-selected data (processing block 1618). If not, processing logic determines whether pre-selected data specified by the policy rules is found (processing block 1606).

If the message does not contain the specified pre-selected data, processing logic adds an indicator of the lack of preselected data to the message header (processing block 1616) and sends the message to the recipient (processing block 1618). If the message contains the specified pre-selected data, processing logic determines whether a recipient/sender exception is satisfied (processing block 1608). If so (i.e., the message recipient and/or sender are authorized to exchange messages containing pre-selected data), processing logic sends the original message to the recipient (processing block 1618). If not, processing logic determines whether conditions based on prior history of the sender and/or recipient are satisfied, processing logic determines whether this condition is satisfied (processing block 1610). If the prior history conditions are not satisfied, processing logic sends the original message to the recipient (processing block 1618). If the prior history conditions are satisfied, processing logic modifies the message as required by the message action policy (processing block 1612) and sends the modified message to the recipient (processing block 1614).

Figure 16A:
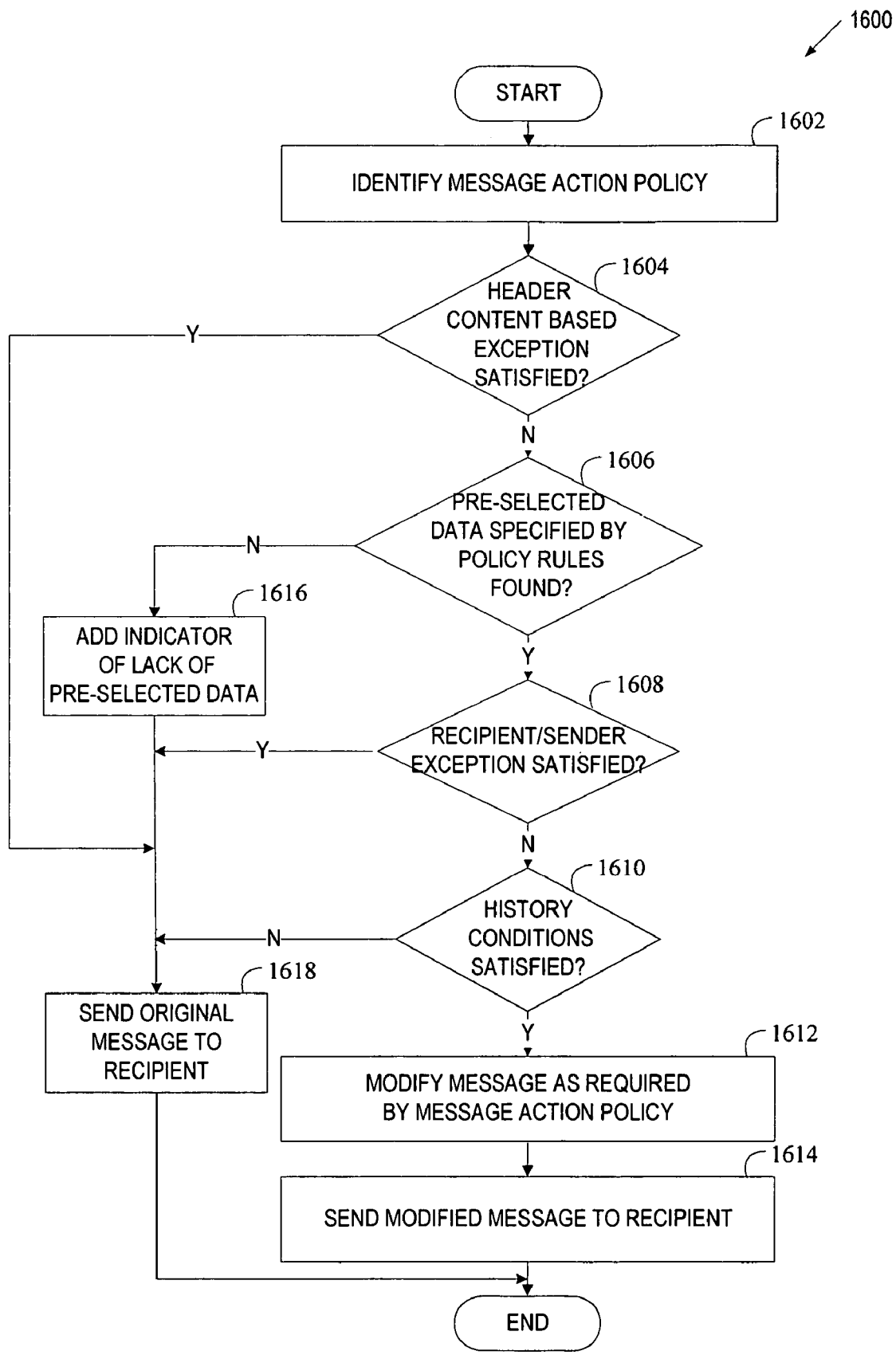
Figure 16B:
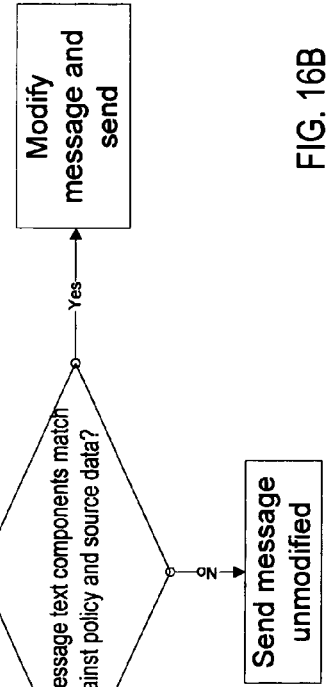
FIG. 16B illustrates a process of modifying an email message based on a specific policy.

FIG. 16B illustrates a process of handling an email message based on a specific policy. As shown, exemplary pre-selected source data 1630 includes an account number column, a last name column, a first name column and a balance column. Policy 1632 requires that an email message be modified if it contains data fragments from a single row of the source data 1630 and these data fragments include information from the first name column, the account number column and the balance column, appearing in the message in any order.

Message 1640 includes data fragments 1642, 1644 and 1646 from row 1634 of the source data 1630 that are from the columns specified by the policy 1632. Hence, the message 1640 will be modified.

Comparison with the Prior Art

Database query mechanisms are significantly different from the teachings described herein. One difference is that B-trees actually contain fragments of the database tables that they index. In the approach described above, there are no copies of the database data stored inside the index. The reason that this is important is that—as mentioned above—the DMS has to have a copy of the index in order to protect the data from escape; however the DMS is also best deployed in a position in the network where it may be exposed to significant threats. Keeping the index that the DMS uses free of any components of the database data is a key requirement.

Another difference between standard database query mechanisms and the invention outlined here has to do with the types of queries that are required. The standard set of queries used in relational databases is based on predicate logic using connectives like AND and OR. This basic system does not work well for detection of database data that is typically cut-and-paste into email and webmail messages. Database data that is cut-and-paste into email messages is typically from reports and will often contain data in each line that is extraneous and not found inside the database table. An example could be an email message that contains, for example, account information for a bunch of customers. Such a message will contain plenty of records from the core database that requires protection, e.g., first name, last name, social-security number, etc., but could also contain information not in the core database tables. A typical example is information that is "joined" from other databases. Another example is simple line formatting tokens that separate fields of database data. Because of the possibility of this extra data that's typically found on each of these lines, the standard predicate logic connectives like AND and OR applied to each token on the line of an outgoing message produce either too many hits (as is the case with OR) or zero hits (as is the case with AND). In the description herein, the system is able to detect the presence of n or more tokens that are all from the same row of a database table, even in the case where n is much smaller than the total number of tokens in the line. This is another significant difference between the present invention and the prior art mentioned above for database and document query mechanisms.

There are several major differences between the techniques described above and information retrieval technologies. Firstly, the indices for these systems contain (inside the concordances) the same terms that are stored in the database that is to be protected. Here again, since the system deploys this index into a location on the network that is potentially under hacker threat; this is a definite disadvantage. Secondly, these query systems run Boolean queries using the forms of predicate logic like AND and OR. As mentioned above, this approach is at a distinct disadvantage for detecting database records that have been possibly "joined" with extraneous data from other tables.

The technique of file shingling is similar to, but substantially different from the technique described herein. In file shingling, the subject of interest is text data (prose, software, outlines, etc.). In the techniques described here, the focus is on protecting database data. One difference is that database data from a given database table may appear with the row order or column order permuted arbitrarily in the test message. These permutations are the simple result of the query mechanisms typically applied to extract database data. A database query could result in a block of database data that comes in arbitrary column order, and arbitrary row order. For this reason, the basic technique of file shingling will not work if applied to database data. File shingling assumes that the same linear sequence is followed between the protected document and the test document.

There are many important differences between Internet content filtering systems and the teachings described herein. As mentioned above, Internet content filtering systems are based on keyword searches. The novel techniques described above build an abstract data structure from the database data that it seeks to protect. This abstract data structure does not contain fragments of the text it is trying to protect. A keyword filtering system must contain some representation of the text that it is searching for in order to run its queries. The second major difference is that these Internet content filtering systems are not intended to protect database data. Using regular expression matching to detect violations of an organizations privacy policy on database data will also lead to a very inaccurate method of detection. These systems are primarily applied to stop employee abuse of the Internet as it relates to pornographic or abusive content and language. Such systems, if applied to the protection of database data, would use regular expressions to match database records. This would also result in transferring fragments of the database data to the computer on the network where security risks are maximized.

An Exemplary Computer System

Figure 17:
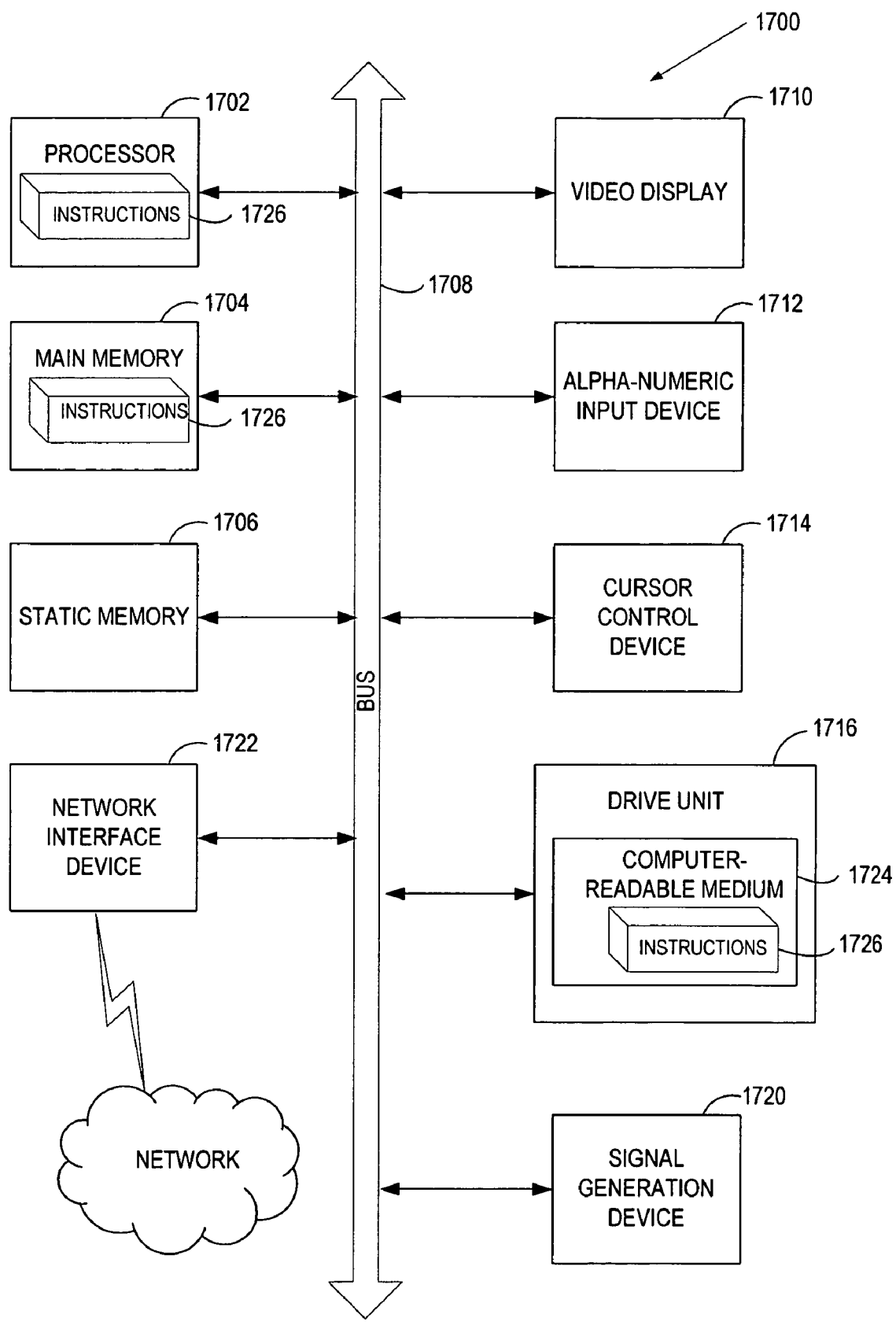
FIG. 17 is a block diagram of an exemplary computer system that may perform one or more of the operations described herein.

FIG. 17 is a block diagram of an exemplary computer system that may perform one or more of the operations described herein. Referring to FIG. 17, computer system 1700 may comprise an exemplary client 1750 or server 1700 computer system. Computer system 1700 comprises a communication mechanism or bus 1711 for communicating information, and a processor 1712 coupled with bus 1711 for processing information. Processor 1712 includes a microprocessor, but is not limited to a microprocessor, such as, for example, Pentium™, PowerPC™, Alpha™, etc.

System 1700 further comprises a random access memory (RAM), or other dynamic storage device 1704 (referred to as main memory) coupled to bus 1711 for storing information and instructions to be executed by processor 1712. Main memory 1704 also may be used for storing temporary variables or other intermediate information during execution of instructions by processor 1712.

Computer system 1700 also comprises a read only memory (ROM) and/or other static storage device 1706 coupled to bus 1711 for storing static information and instructions for processor 1712, and a data storage device 1707, such as a magnetic disk or optical disk and its corresponding disk drive. Data storage device 1707 is coupled to bus 1711 for storing information and instructions.

Computer system 1700 may further be coupled to a display device 1721, such as a cathode ray tube (CRT) or liquid crystal display (LCD), coupled to bus 1711 for displaying information to a computer user. An alphanumeric input device 1722, including alphanumeric and other keys, may also be coupled to bus 1711 for communicating information and command selections to processor 1712. An additional user input device is cursor control 1723, such as a mouse, trackball, trackpad, stylus, or cursor direction keys, coupled to bus 1711 for communicating direction information and command selections to processor 1712, and for controlling cursor movement on display 1721.

Another device that may be coupled to bus 1711 is hard copy device 1724, which may be used for printing instructions, data, or other information on a medium such as paper, film, or similar types of media. Furthermore, a sound recording and playback device, such as a speaker and/or microphone may optionally be coupled to bus 1711 for audio interfacing with computer system 1700. Another device that may be coupled to bus 1711 is a wired/wireless communication capability 1725 to communication to a phone or handheld palm device.

Note that any or all of the components of system 1700 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   monitoring, by a computer system, messages transmitted via a network for presence of pre-selected data, the pre-selected data from a source having a tabular structure;
   upon determining, by the computer system, that a header of an original message transmitted by a sender via the network indicates that the original message is to be searched for pre-selected data, searching, by the computer system, the original message for data fragments that match elements of the pre-selected data from at least one random row within the tabular structure of the source, the pre-selected data including security-sensitive information to be protected from being transmitted via the network, and preventing, by the computer system, an unauthorized transmission of the original message that includes the pre-selected data to a recipient to prevent loss of the security-sensitive information; and
   upon determining, by the computer system, that the header of the original message transmitted by the sender indicates that the original message is not to be searched, facilitating an authorized transmission of the original message to the recipient without searching the original message transmitted by the sender for the pre-selected data and regardless of the presence of the pre-selected data in the original message transmitted by the sender.

2. The method of claim 1 wherein preventing the unauthorized transmission of the pre-selected data to the recipient comprises:
   blocking a transmission of the message to the recipient.

3. The method of claim 2 further comprising:
   notifying at least one of a sender and the recipient of the blocking.

4. The method of claim 1 wherein preventing the unauthorized transmission of the pre-selected data to the recipient comprises:
   rerouting the message to at least one of a quarantine server and an archiving server.

5. The method of claim 4 further comprising:
   receiving from the quarantine server an indication that the message is part of an authorized business process; and
   transmitting the message to the recipient.

6. The method of claim 4 further comprising:
   receiving from the quarantine server an indication that the message is not part of an authorized business process; and
   blocking a transmission of the message to the recipient.

7. The method of claim 4 wherein the quarantine server keeps the message for a specific period of time or until a specified time.

8. The method of claim 1 further comprising:
   sending a copy of the message to an alternate site.

9. The method of claim 1 wherein preventing the unauthorized transmission of the pre-selected data to the recipient comprises:
   injecting into a communication stream additional network packets that terminate a transmission of the message.

10. The method of claim 1 wherein preventing the unauthorized transmission of the pre-selected data to the recipient comprises:
    re-routing the message through a network segment with at least one higher level of channel security.

11. The method of claim 1 wherein preventing the unauthorized transmission of the pre-selected data to the recipient comprises:
    applying at least one action to the message according to a message action policy that specifies the at least one action to be applied to the message if one or more rules of the message action policy are satisfied.

12. The method of claim 11 wherein the one or more rules of the message action policy are selected from the group consisting of
    one or more rules pertaining to the pre-selected data,
    one or more rules pertaining to characteristics of the at least one action,
    a rule specifying an expression pattern,
    a rule specifying a message attachment type,
    a rule specifying a message attachment size,
    a rule specifying a sender identifier pattern,
    a rule specifying a recipient identifier pattern,
    a rule specifying keywords,
    a rule specifying a file attachment name pattern,
    a rule specifying a protocol to carry the message, and
    a rule specifying a newsgroup name.

13. The method of claim 11 wherein the message action policy comprises an exception clause identifying an exception to the one or more rules.

14. The method of claim 13 wherein the exception clause declares at least one of a sender and a recipient authorized to have access to the pre-selected data.

15. The method of claim 11 wherein the message action policy specifies additional conditions for triggering at least one action, the additional conditions pertaining to historical data associated with at least one of a sender and the recipient.

16. The method of claim 1 wherein the message is any one of an outbound message, an inbound message and an internal message.

17. The method of claim 1 wherein the message is any one of an email message, an instant messaging (IM) message, a message exchange during a telnet session, a message exchanged during a file transfer protocol (FTP) session, a message exchanged during a hypertext transfer protocol (HTTP) session, a message exchanged during a simple object access protocol (SOAP) session, a message exchanged during a transmission control protocol/Internet protocol (TCP/IP) session, a message exchanged during a user datagram protocol (UDP) session, a message exchanged during an Ethernet session, and a message exchanged during a 801.11 session.

18. A method comprising:
monitoring, by a computer system, messages transmitted via a network for presence of pre-selected data, the pre-selected data from a source having a tabular structure;
determining, by the computer system, that a header of a message for transmission to a recipient via the network indicates that the message is to be searched for pre-selected data;
searching, by the computer system, the message for data fragments that match elements of the pre-selected data from at least one random row within the tabular structure of the source, the pre-selected data including security-sensitive information to be protected from being transmitted via the network; and
applying at least one action to the message according to a message action policy that specifies the at least one action to be applied to the message if one or more rules of the message action policy are satisfied, wherein the message action policy comprises an exception clause identifying an exception to the one or more rules and the exception clause requires that a message contain a header identifying the message as marketing material to be sent to the recipient without being searched for the pre-selected data.

19. An apparatus comprising:
means for monitoring messages transmitted via a network for presence of pre-selected data, the pre-selected data from a source having a tabular structure;
means for determining whether a header of an original message transmitted by a sender via the network indicates that the original message is to be searched for pre-selected data;
means for searching the original message for data fragments that match elements of the pre-selected data, the pre-selected data being from at least one random row within the tabular structure of the source, the pre-selected data including security-sensitive information to be protected from being transmitted via the network, upon determining that the header of the original message transmitted by the sender indicates that the original message is to be searched, and means for preventing an unauthorized transmission of the original message that includes the pre-selected data to a recipient to prevent loss of the security-sensitive information; and
means for facilitating an authorized transmission of the original message to the recipient without searching the original message for the pre-selected data and regardless of the presence of the pre-selected data in the original message transmitted by the sender upon determining that the header of the original message transmitted by the sender indicates that the original message is not to be searched.

20. A system comprising:
a memory to store information pertaining to pre-selected data and instructions for data loss prevention; and
a processor, coupled to the memory, to execute the instructions, wherein the instructions cause the processor to monitor messages transmitted via a network for presence of pre-selected data, upon a determination that a header of a monitored message for transmission to a recipient via the network indicates that the monitored message is to be searched for pre-selected data, to search the monitored message for data fragments that match elements of the pre-selected data, the pre-selected data being from at least one random row within a tabular structure of a source, the pre-selected data including security-sensitive information to be protected from being transmitted via the network, and to block the monitored message for preventing an unauthorized transmission of the pre-selected data to the recipient to prevent loss of the security-sensitive information, and upon a determination that the header of the monitored message identifies the message as marketing material, to facilitate an authorized transmission of the monitored message to the recipient without searching the monitored message for the pre-selected data.

21. A non-transitory computer readable storage medium that provides instructions, which when executed on a processing system cause the processing system to perform a method comprising:
monitoring messages transmitted via a network for presence of pre-selected data, the pre-selected data from a source having a tabular structure;
upon determining that a header of an original message transmitted by a sender via the network indicates that the original message is to be searched for pre-selected data, searching the original message for data fragments that match elements of the pre-selected data, the pre-selected data being from at least one random row within the tabular structure of the source, the pre-selected data including security-sensitive information to be protected from being transmitted via the network, and preventing an unauthorized transmission of the original message that includes the pre-selected data to a recipient to prevent loss of the security-sensitive information; and
upon determining that the header of the original message transmitted by the sender indicates that the original message is not to be searched, facilitating an authorized transmission of the original message to the recipient without searching the original message transmitted by the sender for the pre-selected data and regardless of the presence of the pre-selected data in the original message transmitted by the sender.

* * * * *